US 8,386,356 B2

(12) United States Patent
Saccone

(10) Patent No.: US 8,386,356 B2
(45) Date of Patent: Feb. 26, 2013

(54) METHOD FOR CALCULATION OF TIME WEIGHTED RETURNS FOR PRIVATE EQUITY

(76) Inventor: Massimiliano Saccone, Milan (IT)

(*) Notice: Subject to any disclaimer, the term of this patent is extended or adjusted under 35 U.S.C. 154(b) by 90 days.

(21) Appl. No.: 13/108,355

(22) Filed: May 16, 2011

(65) Prior Publication Data

US 2012/0296843 A1 Nov. 22, 2012

(51) Int. Cl.
*G06Q 40/00* (2012.01)
(52) U.S. Cl. .......................... 705/36 R; 705/35
(58) Field of Classification Search .............. 705/35, 705/36 R
See application file for complete search history.

(56) References Cited

U.S. PATENT DOCUMENTS

| | | | | |
|---|---|---|---|---|
| 7,426,488 B1 * | 9/2008 | Gompers et al. | ............. | 705/36 R |
| 7,698,188 B2 * | 4/2010 | Hollas et al. | ................... | 705/35 |
| 7,698,196 B1 * | 4/2010 | Rouvinez et al. | ........... | 705/36 R |
| 7,752,090 B2 * | 7/2010 | Trainer | ............................ | 705/30 |
| 2006/0253356 A1 * | 11/2006 | Charles et al. | .................. | 705/35 |
| 2007/0100724 A1 * | 5/2007 | Hollas et al. | ................. | 705/36 R |
| 2007/0168270 A1 * | 7/2007 | De Diego Arozamena et al. | ............................ | 705/36 R |
| 2010/0241592 A1 * | 9/2010 | Trainer | ........................ | 705/36 R |
| 2010/0250307 A1 * | 9/2010 | Hollas | ................................ | 705/7 |
| 2011/0153522 A1 * | 6/2011 | Hollas | ........................... | 705/36 R |
| 2011/0161245 A1 * | 6/2011 | Hollas | ........................... | 705/36 R |
| 2011/0161246 A1 * | 6/2011 | Gottschalg | .................... | 705/36 R |

* cited by examiner

*Primary Examiner* — Jagdish Patel
*Assistant Examiner* — Sara C Hamilton
(74) *Attorney, Agent, or Firm* — Lando & Anastasi LLP

(57) ABSTRACT

Method for the calculation of performance data for a private equity fund, including acquiring input data for a first transaction of cash flow patterns during a term of the fund, having a plurality subperiods having a value for contribution and a value for the distribution in each subperiod; acquiring input data for a plurality of rates of interest; calculating a first value for an average duration of contributions and a second value for an average duration of distributions; calculating a third value for a net duration of said first transaction; calculating a bullet transaction equivalent to the first transaction, by calculating a fourth value for a bullet investment paid at the time represented by the first value and a fifth value for a bullet reimbursement received at the time represented by the second value; and calculating a sixth value for a duration adjusted return on capital.

20 Claims, 15 Drawing Sheets

| Year | 0 | 1 | 2 | 3 | 4 | 5 | 6 | 7 | 8 | 9 | 10 |
|---|---|---|---|---|---|---|---|---|---|---|---|
| Contributions | 0 | -15 | -20 | -20 | -15 | -10 | -5 | -5 | -5 | -5 | 0 |
| Cumulative Contributions | 0 | -15 | -35 | -55 | -70 | -80 | -85 | -90 | -95 | -100 | -100 |
| Uncalled capital | 100 | 85 | 65 | 45 | 30 | 20 | 15 | 10 | 5 | 0 | 0 |
| Distributions | 0 | 0 | 5 | 10 | 55 | 35 | 45 | 20 | 20 | 20 | 20 |
| Cumulative Distribution | 0 | 0 | 5 | 15 | 70 | 105 | 150 | 170 | 190 | 210 | 230 |
| Net cash flow | 0 | -15 | -15 | -10 | 40 | 25 | 40 | 15 | 15 | 15 | 20 |
| Cumulative Net CF | 0 | -15 | -30 | -40 | 0 | 25 | 65 | 80 | 95 | 110 | 130 |
| Cash | 100 | 85 | 70 | 60 | 100 | 125 | 165 | 180 | 195 | 210 | 230 |
| NAV Invested capital | 0 | 15 | 37 | 63 | 50 | 47 | 27 | 24 | 20 | 14 | 0 |
| Total Wealth | 100 | 100 | 107 | 123 | 150 | 172 | 192 | 204 | 215 | 224 | 230 |

Fig. 1a

| A | B | C<br>(1+B) | D<br>(D-1×C) | E<br>(D^(1/A)-1) | F<br>(1/D) | G | H | I<br>(G+H) | J<br>(F×G) | K<br>(J×A) | L<br>(F×H) | M<br>(L×A) |
|---|---|---|---|---|---|---|---|---|---|---|---|---|
| time | rate | multipliers<br>yr / cum | | discount<br>factor | price | contr | distr | net<br>CFs | NPV<br>contr | Dc | NPV<br>distr | Dd |
| $t_1$ | | | | | | | | | | | | |
| $t_2$ | | | | | | | | | | | | |
| .... | | | | | | | | | | | | |
| $t_n$ | | | | | | | | | | | | |
| totals | | | | | | | | | | | | |

Fig. 7

| A | B | C (1+B) | D (D-1×C) | E (D^(1/A)-1) | F (1/D) | G | H | I (G+H) | J (F×G) | K (J×A) | L (F×H) | M (L×A) |
|---|---|---|---|---|---|---|---|---|---|---|---|---|
| time | rate | multipliers yr / cum | | discount factor | price | contr | distr | net CFs | NPV contr | Dc | NPV distr | Dd |
| 0 | | 1,00 | 1,00 | | | - | - | - | - | - | - | - |
| 1 | 2,2% | 1,02 | 1,02 | 2,2% | 0,98 | - 15,0 | - | - 15,0 | - 14,7 | - 14,7 | - | - |
| 2 | 3,1% | 1,03 | 1,05 | 2,6% | 0,95 | - 20,0 | 5,0 | - 15,0 | - 19,0 | - 38,0 | 4,7 | 9,5 |
| 3 | 4,3% | 1,04 | 1,10 | 3,2% | 0,91 | - 20,0 | 10,0 | - 10,0 | - 18,2 | - 54,6 | 9,1 | 27,3 |
| 4 | 4,6% | 1,05 | 1,15 | 3,5% | 0,87 | - 15,0 | 55,0 | 40,0 | - 13,0 | - 52,1 | 47,8 | 191,1 |
| 5 | 1,2% | 1,01 | 1,16 | 3,0% | 0,86 | - 10,0 | 35,0 | 25,0 | - 8,6 | - 42,9 | 30,1 | 150,3 |
| 6 | 0,7% | 1,01 | 1,17 | 2,6% | 0,85 | - 5,0 | 45,0 | 40,0 | - 4,3 | - 25,6 | 38,4 | 230,3 |
| 7 | 0,5% | 1,00 | 1,18 | 2,3% | 0,85 | - 5,0 | 20,0 | 15,0 | - 4,2 | - 29,7 | 17,0 | 118,9 |
| 8 | 0,6% | 1,01 | 1,18 | 2,1% | 0,84 | - 5,0 | 20,0 | 15,0 | - 4,2 | - 33,8 | 16,9 | 135,1 |
| 9 | 0,7% | 1,01 | 1,19 | 2,0% | 0,84 | - 5,0 | 20,0 | 15,0 | - 4,2 | - 37,7 | 16,8 | 151,0 |
| 10 | 0,9% | 1,01 | 1,20 | 1,8% | 0,83 | - | 20,0 | 20,0 | - | - | 16,6 | 166,3 |
| totals | | | | | | -100,0 | 230 | | - 90,4 | - 329,1 | 197,3 | 1.180 |

Fig. 8b

METHOD FOR CALCULATION OF TIME WEIGHTED RETURNS FOR PRIVATE EQUITY

BACKGROUND OF THE INVENTION

1. Field of Invention

The present invention relates generally to asset classes performance calculation. More specifically, the present invention relates to systems and methods for measuring private equity (and generally private capital) investment performance, that would otherwise be measured in IRR terms.

2. Discussion of Related Art

Performance measurement is an important task for both investors and investment managers. Whichever asset class is considered, performance must be calculated in order to measure and compare the profitability of investments and to adopt proper risk management and asset allocation methodologies.

As private equity is increasingly becoming a typical investment allocation for institutional investors, banks, and high net worth individuals, its risk/reward characteristics need to be better understood and managed like for any other asset class. Unfortunately, applying standard performance evaluation techniques to private equity is a challenging task.

In fact, the lack of time series of market prices makes objectively difficult the use of standard risk management and asset allocation methodologies and the definition of the absolute and relative risk profiles for private equity.

Private equity investing, differently from all other asset classes, require the capital committed normally not being invested immediately at the subscription of the contract, generally a Limited Partnership Agreement (LPA); the committed capital is rather "called" to be invested by the general partner (GP or investment manager) discretionarily both in terms of timing and quantity, within the limits set in the LPA, over the certain terms of the contract. Therefore, private equity investments require and generate a stream of negative and positive cash flows spread over the term of a contract.

In this context, the main performance measures that have been used in practice in the art are the Internal Rate of Return (IRR) and variants thereof, and so called multiples on capital.

An example of such approach will be now illustrated with reference to FIGS. 1a and 1b, which illustrate representative pro-form a cash flow patterns of an hypothetical private equity fund, considered on a stand-alone basis.

In this simplified representation, an hypothetical investor (limited partner—LP) who commits 100 cash units to a fund that contractually is expected to have a 10 years term, over this term will see the cash called and returned by the investment manager (the GP) as described respectively by the contributions and distributions rows of the table depicted in FIG. 1a. The consequent investor's cash and total wealth positions are arithmetically derived in the table, under the assumption (as in the art) that the net asset value of the investments in place (NAV Invested Capital) is calculated as the net asset value of the future net cash flows, discounted at their pooled internal rate of return.

By investing (i.e. committing his total initial wealth of 100—the stand alone hypothesis) in the representative fund described by FIG. 1a, the hypothetical investor sees, over the 10 years term, his net wealth growing from 100 to 230 cash units. On a stand alone basis, he will calculate his net wealth to have increased in the 10-year period by a compound annual growth rate (CAGR) of 8.7%. The GP will instead (customarily) summarize the results of its investment activity by reporting the standard measures of internal rate of return (IRR) at 44% and multiple (Total Value versus Paid In—TVPI) of 2.3× on the invested capital.

FIG. 1b graphically depicts the cash flow patterns of the hypothetical fund being considered in FIG. 1a.

The discrepancy between the IRR of the investment and the CAGR of the wealth is conceptually reconciled by analyzing the net cash utilization pattern of the private equity mechanics For the hypothetical fund considered, FIG. 1b shows that the maximum level of net cash drawn from the investor's commitment is 40 units (or 40% of the committed capital) reached at year 3. This means that, on average over the term of the contract, always more of 60% of the initial commitment is left to the investor. It also means that, on average, the investment manager has used less than 40% of the initially committed capital but overall has increased it by a factor of 325%.

The example shows the potential of private equity as a capital-efficient investment methodology, with capital efficiency effectively captured by the IRR measure. This is particularly true in cases, such as the one represented, when the private equity investments produce good results. Nevertheless, even in this simple case, the IRR measure fails to indicate how good these results are.

However, in general terms, neither the IRR nor the multiples are appropriate measures for the purposes of providing meaningful, and comparable, performance data for private equity. In fact such measures are prone to misleading indications, as will be shown below with another example, and with reference to FIG. 2.

FIG. 2 shows three different simplified investment opportunities, portfolio A, portfolio B and portfolio C, with identical cash flows but different timing. The performance of the three portfolios is identical both in terms of IRR (25%) and TVPI (1.5×).

Intuitively instead, the three initiatives may not be identically attractive as the performance indicators (identical IRR and TVPI value) could imply. Assuming identical commitment dates and amounts for the three opportunities, the initiative represented by Portfolio A provides a much faster turnover of the capital, invested at year 1 and fully divested at year 3. In other words Portfolio A appears to have a lower opportunity cost.

More misleading conclusions could be drawn without the information regarding the level of drawn capital versus the amount originally committed. In fact, while the limited use of capital increases the IRR, large amounts of committed capital left undrawn on the balance sheet of investors dilute the actual growth of their total wealth.

The several shortcomings of IRR and multiples with respect to calculation, to prioritization of investment projects and to comparison against the average return of to other asset classes are well known in the art.

In particular, it is known that IRR should not be compared to the average rate of return of stock market indices over the same period, not only due to the fact that IRRs and time-series averages of market returns are different in nature, but also because the underlying amounts invested in private equity at any point in time over the comparison period should be different from those of the equity market index.

Moreover, multiples, such as the Distributed over Invested Capital (DIC) or the Total Value over Paid In capital (TVPI), fail to take into account the time value of money and therefore their significance is limited in a context of comparison and prioritization of investment projects.

Alternative methodologies, such as the Public Market Equivalent (PME) and the Modified IRR (MIRR), have been proposed to overcome the above mentioned limitations; however, these methodologies in substance replace the IRR as reinvestment rate with a determined hurdle rate or a benchmark's rate of return, improving comparability but adding elements of subjectivity.

Summarizing, traditional methodologies for measuring private equity performance known in the state of art fail to provide performance indicators which are objective, meaningful, not misleading and comparable with the other asset classes.

In particular such methodologies do not take into account concepts such as financial duration and discounting to deal with the peculiarities of the capital call based investment mechanics, for which private equity is either cash at work or waiting to be deployed. When used, the concept of duration is calculated adopting subjective discount rates, such as the IRR, therefore hindering its effectiveness.

This leads to a "valuation isolation" anomaly, that causes private equity to be incomparable with all other asset classes; as a result, private equity is put at a disadvantage, in terms of general understanding and risk-return appreciation, versus most of the other asset classes.

SUMMARY OF THE INVENTION

The aim of the present invention is to provide a new system and method for the calculation of performance data for private equity overcoming the above mentioned drawbacks.

Within this aim, an object of the present invention is to introduce a system and method for the calculation of performance data for private equity (or generically capital) investments which is able to produce time weighted calculation data for private equity, thus removing the inefficiencies caused by the current valuation standards.

Another object of the invention is to provide a system and method for the calculation of performance data for private equity suitable to render private equity comparable with other asset classes, thus removing the valuation isolation of private equity.

Yet another object of the invention is to provide a system and method for the calculation of performance data for private equity which allows the reconciliation between the GP's objectives of efficient use of the capital and the LP's allocation of the cash availabilities.

Another object of the invention is to provide a system and method for the calculation of performance data for private equity which improves transparency and benchmarking and creates the conditions for applications that increase liquidity.

At least one aspect is directed to a computer implemented method for the calculation of performance data for a private equity fund. The computer implement method includes an act of acquiring, at an input device, input data representative of a first transaction of cash flow patterns of said private equity fund during a term of said fund, said term being divided into a plurality subperiods $t_0, t_1, \ldots t_n$, wherein for each subperiod $t_i$, a value for contribution $Contr_i$ and a value for the distribution $Distr_i$ in to that subperiod is supplied. The computer implemented method also includes and act of acquiring input data representative of a plurality of rates of interest $r_0, r_1, \ldots r_n$ respectively associated to said plurality of subperiods, and an act of calculating, based on said input data representative of said first transaction of cash flow patterns and on said input data representative of said plurality of rates of interest, a first value representative of an average duration of contributions and a second value representative of an average duration of distributions for said fund. The computer implemented method further includes an act of calculating, based on said first value and said second value, a third value representative of a net duration of said first transaction, and an act of calculating, based on said first value, said second value and said third value, a second bullet transaction equivalent to said first transaction, by calculating a fourth value representative of a bullet investment paid at the time represented by said first value and a fifth value representative of a bullet reimbursement received at the time represented by said second value. The computer implemented method also includes an act of calculating, based on said second transaction and said third value, a sixth value representative of a duration adjusted return on capital—DaRC.

At least one aspect is directed to a non-transitory computer readable medium having stored thereon sequences of instruction that include instructions that will cause a processor to acquire input data representative of a first transaction of cash flow patterns of a private equity fund during a term of said fund, said term being divided into a plurality subperiods $t_0, t_1, \ldots t_n$, wherein for each subperiod $t_i$, a value for contribution $Contr_i$ and a value for the distribution $Distr_i$ in that subperiod is supplied. The instructions also cause the processor to acquire input data representative of a plurality of rates of interest $r_0, r_1, \ldots r_n$ respectively associated to said plurality of subperiods, and to calculate, based on said input data representative of said first transaction of cash flow patterns and on said input data representative of said plurality of rates of interest, a first value representative of an average duration of contributions to and a second value representative of an average duration of distributions for said fund. The instructions include at least one instruction to cause the processor to calculate, based on said first value and said second value, a third value representative of a net duration of said first transaction, and to calculate, based on said first value, said second value and said third value, a second bullet transaction equivalent to said first transaction, by calculating a fourth value representative of a bullet investment paid at the time represented by said first value and a fifth value representative of a bullet reimbursement received at the time represented by said second value. The instructions also include at least one instruction that will cause the processor to calculate, based on said second transaction and said third value, a sixth value representative of a duration adjusted return on capital—DaRC.

At least one aspect is directed toward a computer system having a processor and an interface device. The interface device is configured to acquire input data representative of a first transaction of cash flow patterns of a private equity fund during a term of said fund, said term being divided into a plurality subperiods $t_0, t_1, \ldots t_n$, wherein for each subperiod a value for contribution $Contr_i$ and a value for the distribution $Distr_i$ in that subperiod is supplied. The interface device is also configured to acquire input data representative of a plurality of rates of interest $r_0, r_1, \ldots r_n$ respectively associated to said plurality of subperiods. The processor is configured to calculate, based on said input data representative of said first transaction of cash flow patterns and on said input data representative of said plurality of rates of interest, a first value representative of an average duration of contributions and a second value representative of an average duration of distributions for said fund. The processor is also configured to calculate, based on said first value and said second value, a third value representative of a net duration of said first transaction. The processor is further configured to calculate, based on said first value, said second value and said third value, a second bullet transaction equivalent to said first transaction, by calculating a fourth value representative of a bullet investment paid at the time represented by said first value and a fifth value representative of a bullet to reimbursement received at the time represented by said second value. The processor is also configured to calculate, based on said second transaction and said third value, a sixth value representative of a duration adjusted return on capital—DaRC.

At least some of these aspects and embodiments are achieved by the methods and systems according to independent claim 1 and the other independent claims. Further details may be found in the remaining dependent claims.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Further characteristics and advantages of the invention will become better apparent from the detailed description of particular but not exclusive embodiments, illustrated by way of non-limiting examples in the accompanying drawings, wherein:

FIG. 1a is a table describing data of an exemplary private equity fund;

FIG. 1b is a chart depicting the cash flow patterns of the fund described in FIG. 1a;

FIG. 7 is a table describing a possible organization of data in form of a spreadsheet for the calculation of the DaRC indicator according to the present invention;

FIG. 8b is a table representing the exemplary data of FIGS. 1a and 8a organized in the spreadsheet of FIG. 7 to be used as input data for carrying out the method of FIG. 3 according to the present invention;

DETAILED DESCRIPTION

Figure 1B:
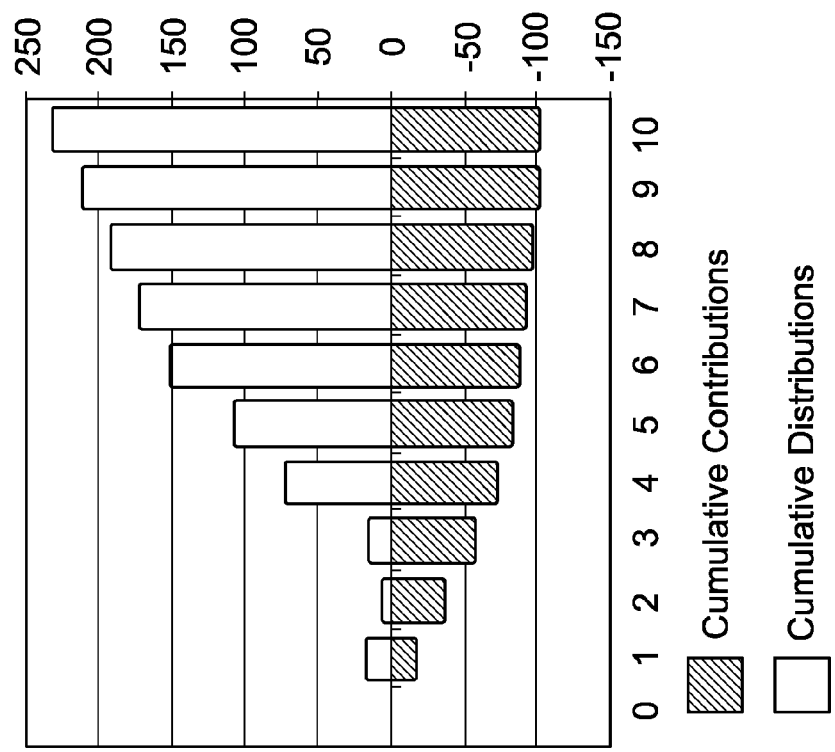
Figure 1B:
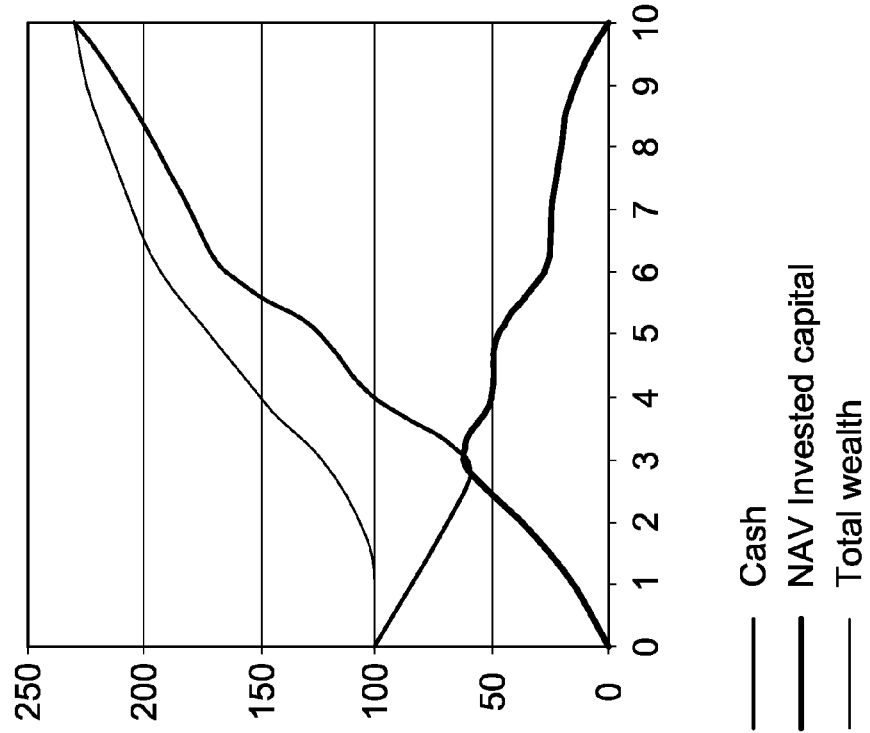

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

In the following a duration based system and method for the calculation of private equity time weighted returns will be disclosed.

To this aim, a concept of financial duration, already known with respect to the fixed income security analysis, is extended to private equity based on the following similarities of this asset class with fixed income securities: private equity initiatives have a contractual maturity date; in private equity and bonds cash flows to investors are the key elements for valuation.

As already mentioned, private equity investments can be represented as either cash at work or waiting to be deployed. The relevant yield curves are the only objective common denominator to put the cash flow patterns in the context of the to overall economy and the other available investment opportunities. They also allow the reconciliation between the GP's objectives of efficient use of the capital and the LP's allocation of the cash availabilities.

In short, the durations of contributions, that is to say the capital calls or draw-downs, and the durations of distributions, that is to say the reimbursements of invested capital and payments of eventual interests, dividends and capital gains, are used to create a transaction financially equivalent over the relevant yield curve to the stream of spread cash flows of the typical private equity investment—that will be defined later as equivalent bullet transaction (EBT). In other terms, the two durations will synthesize the centers of gravity (the maturities) of a financially equivalent bullet transaction.

More specifically, a possible embodiment of a method for calculating a newly introduced indicator named Duration adjusted Return on Capital (DaRC) according to the present invention will be now illustrated with reference to FIG. 3.

The method starts at step 310, in which the characterizing features of the private equity fund, in terms of start and term of the contract and of the cash flow patterns along the duration of the term, are received as input from an external source or retrieved from archiving means. More specifically, in a preferred embodiment the input data is supplied so that the term is divided in subperiods $t_0, t_1, \ldots t_n$, and, for each subperiod $t_i$, a value for contribution $contr_i$ and a value for the distribution $distr_i$ in that subperiod is supplied. In an embodiment each subperiod spans one year; in one embodiment each subperiod spans one day.

At step 320, for each subperiod i, a value for a percentage rate is received as input from an external source or retrieved form archiving means. This rate, indicated in the following as or in short $r_{ti-1,ti}$ for each subperiod i, represents the relevant free risk rate of interest at which cash commitments are considered invested. In one embodiment, the Euribor rate (or the different reference rate considered in relation to the investments) in the given subperiod is chosen as the rate of interest.

The data supplied at step 10 and 20 are preferably combined and memorized as an (n+1)*4 matrix M, as shown below:

$$M = \begin{bmatrix} t_0 & contr_0 & distr_0 & rate_0 \\ t_1 & contr_1 & distr_1 & rate_1 \\ \ldots & \ldots & \ldots & \ldots \\ t_n & contr_n & distr_n & rate_n \end{bmatrix}$$

At step 330, the data that has been input at steps 310 and 320 are used to calculate the individual factors $Dc_0, Dc_1 \ldots Dc_n$ for the calculation of the duration for contributions and the individual factors $Dd_0, Dd_1 \ldots Dd_n$ for the calculation of the duration of distributions in each subperiod, as well as the average duration of contributions $Dc_{AVG}$ and distributions $Dd_{AVG}$, as will be illustrated in more detail with reference to FIG. 4.

The values of average durations of contributions and distributions calculated at step 330 are used at step 335 to calculate the net duration of the transaction nD, according to the formula:

$$nD = Dd_{AVG} - Dc_{AVG}.$$

At step 340, on the basis of the values calculated at step 330 and 335, a bullet transaction financially equivalent to the stream of cash flows of the original transaction, in which the durations are the maturities, is calculated. This transaction will be named the equivalent bullet transaction (EBT).

In particular two amounts are calculated, fv_NPV_contr and fv_NPV_distr, which respectively represent the bullet investment and the bullet reimbursement respectively paid and received at year/month/day $Dc_{AVG}$ and $Dd_{AVG}$ in the private equity transaction EBT, equivalent to the stream of cash flows of the original transaction. A preferred embodiment of a method for calculating the above amounts will be disclosed in detail in the following with reference to FIG. 5.

At step 350, the Duration adjusted Return on Capital (DaRC) is defined as the time weighted growth rate in the financially equivalent transaction (EBT) defined at step 340. The DaRC thus represents the intrinsic return potential of private equity, its leverage and capital efficiency, in the specific time frame identified by the net duration (nD).

The DaRC is calculated as the compound growth average rate (over the reference period defined by the net duration) between the respective future values of the net present value of contributions and distributions over the period defined by the net duration, according to the following formula:

$$DaRC = (fv\_NPV\_distr/fv\_NPV\_contr)^{\wedge}(1/nD) - 1.$$

A possible method for executing step 330 described above of calculating the average durations of distributions and contributions will now be illustrated with reference to FIG. 4.

The method starts at step 410, in which for, each subperiod $t_i$, the duration for the contributions in subperiod i, $Dc_i$, is calculated recursively based on the values contained in matrix M and collected in previously described steps 310 and 320.

More specifically, given the following known indicators that can be defined and calculated for each subperiod i, based on the values of $t_i$, $contr_i$, $distr_i$ and $rate_i$:

| Name | Abbreviation | Meaning | Formula |
|---|---|---|---|
| subperiod multiplier | yr_mult | Future value after one subperiod (e.g. one year) | $yr\_mult_i = 1 + r_i$ |
| cumulative multiplier | cum_mult | Future value referred to the yield to maturity YTM for period up to i | $cum\_mult_i = (1+r_1) * (1+r_2) * \ldots * (1+r_i)$ |
| discount factor | disc_fact | periodic yield to maturity – average rate on the temporal horizon | $disc\_fact_i = cum\_mult_i\hat{\,}(1/t_i) - 1$ |
| price | price | Discount factor for the calculation of the net present value of a unit of currency over a $t_0$-$t_i$ period | $price_i = 1/cum\_mult_i$ |
| net Cash flows | net_CFs | net Cash flows | $net\_CFs_i = contr_i + distr_i$ |
| net present value of all contributions | NPV_contr | Net present value of the contribution happening in $t_i$ | $NPV\_contr_i = contr_i * price_i$ |
| net present value of all distributions | NPV_distr | Net present value of the distribution happening in $t_i$ | $NPV\_distr_i = distr_i * price_i$ |

For each i>0, $Dc_i$ is calculated according to the following formula:

$$Dc_i = t_i * NPV\_contr_i$$

Given that $Dc_0 = 0$ and $cum\_mult_0 = 1$, the values for $Dc_i$ can be inductively calculated for each subperiod $t_i$, by substituting the above formulas:

$$Dc_i = t_i * NPV\_contr_i = t_i * Contr_i * price_i = t_i * Contr_i / cum\_mult_i = t_i * Contr_i / [(1+r_0)*(1+r_1)* \ldots *(1+r_i)]$$

At step 420 for each subperiod i, the $Dd_i$ factors for the calculation of the average duration of the distributions are calculated in an analogous fashion as the $Dc_i$ factors for the calculation of the average duration of the contributions performed in to step 410, but taking into account the net present value for distributions instead of the net present value for contributions:

$$Dd_i = t_i * NPV\_distr_i = t_i * Distr_i * price_i = t_i * Distr_i / cum\_mult_i = t_i * Distr_i / [(1+r_0)*(1+r_1)* \ldots *(1+r_n)]$$

As will be apparent to those skilled in the art, the values $Dc_0, Dc_1, Dc_n$ and $Dd_0, Dd_1, Dd_n$ can also be conveniently calculated by means of a spreadsheet in which the calculated columns are outlined as indicated in FIG. 7.

At step 430 the average duration of the contributions, $Dc_{AVG}$, is calculated according to the following formula, known in the art:

$$Dc_{AVG} = \frac{\sum_{i=0}^{n} t_i * NPV\_contr_i}{\sum_{i=0}^{n} NPV\_contr_i} = \frac{\sum_{i=0}^{n} Dc_i}{\sum_{i=0}^{n} NPV\_contr_i}$$

Again, it is obvious for the skilled person to perform the above calculation with the help of a spreadsheet, for instance by dividing the total of column K by the total of column J in the exemplary spreadsheet outlined in FIG. 7.

Finally, at step 440 the average duration of the distributions, $Dd_{AVG}$, is calculated according to an analogous formula to the one set forth above for the durations of the contributions, i.e.:

$$Dd_{AVG} = \frac{\sum_{i=0}^{n} t_i * \text{NPV\_distr}_i}{\sum_{i=0}^{n} \text{NPV\_distr}_i} = \frac{\sum_{i=0}^{n} Dd_i}{\sum_{i=0}^{n} \text{NPV\_distr}_i}$$

Or, in spreadsheet terms, the quotient between the total of column M and the total of column L in the exemplary spreadsheet of FIG. 7.

A possible method for executing step 340 described above of calculating the financially equivalent bullet transaction of the original transaction will now be illustrated with reference to FIG. 5.

The objective of this method is to create a financially equivalent bullet transaction in which the durations are the maturities; in other words, considered the transaction defined by matrix M':

$$M' = \begin{bmatrix} t_0 & contr_0 & distr_0 \\ t_1 & contr_1 & distr_1 \\ \ldots & \ldots & \ldots \\ t_n & contr_n & distr_n \end{bmatrix}$$

the objective is to calculate a second matrix M"

$$M'' = \begin{bmatrix} Dc_{AVG} & EBC \\ Dd_{AVG} & EBD \end{bmatrix}$$

such that:
the subperiods considered in M" correspond to the previously calculated average duration of contributions and of distributions.
the values EBC and EBD correspond to the bullet contribution equivalent to the stream of cash outflows and to the bullet distribution equivalent to the stream of cash inflows, respectively, that render the two transactions financially equivalent.

By financially equivalent is meant that, ex post, when all the data are known for certain (as in the case of performance calculation), under the assumption that a credit worthy institution is able to lend and borrow on the reference free-risk curve (i.e. the Euribor), with respect to final wealth production it is indifferent to consider the stream of cash flows or the bullet transaction. In other words, the same logic applied to the zero coupon bond equivalence in the case of fixed income world is applied to private equity.

This transaction will be referred to as the Equivalent Bullet Transaction (EBT).

In order to determine the EBT, having determined average durations of distributions and of contributions at step 330, what remains to be determined are the amounts that make up the EBT (i.e. EBC and EBD).

At step 510, the total of the net present value of all contributions (NPV contr) is calculated, that is to say the total of column J of FIG. 7.

At step 520, the EBC, i.e. the bullet contribution equivalent to the stream of cash outflows is calculated, given the total of the net present value of all contributions calculated at step 410 and given the yield curve considered, by moving forward the total calculated at step 510 over the curve up to the period (e.g. year) indicated by the value $Dc_{AVG}$ calculated at step 330.

In the case of the simplified annual modeling, in order to achieve this result the NPV of the contribution needs to be multiplied by the cumulative multiplier (column D) for the year obtained by rounding up the value $Dc_{AVG}$ (this value is also named fv_NPV_contr).

Summarizing, the EBC is calculated according to the following formula:

$$EBC = \left( \sum_{i=0}^{n} \text{NPV\_contr}_i \right) * \text{cum\_mult}_{[ROUNDUP(Dc_{AVG})]}$$

At step 530, the total of the net present value of all distributions (NPV distr) is calculated, that is to say the total of column L in the spreadsheet of FIG. 7.

At step 540, the EBD, i.e. the bullet distribution equivalent to the stream of cash inflows is calculated, given the total of the net present value of all contributions calculated at step 430 and given the yield curve considered, by moving forward the total calculated at step 530 over the curve up to year indicated by the value $Dd_{AVG}$ calculated at step 330.

In the case of the simplified annual modeling, in order to achieve this the NPV of the contribution needs to be multiplied by the cumulative multiplier (column D) for the year obtaining by rounding up the value $Dd_{AVG}$ (this value is also named fv_NPV_distr).

Summarizing, the EBD is calculated according to the following formula:

$$EBD = \left( \sum_{i=0}^{n} \text{NPV\_distr}_i \right) * \text{cum\_mult}_{[ROUNDUP(Dd_{AVG})]}$$

The calculated amounts EBC and EBD would respectively be the bullet investment and the bullet reimbursement respectively paid and received at year $Dc_{AVG}$ and at year $Dd_{AVG}$ in the private equity EBT equivalent to the stream of cash flows of the original transaction.

Those skilled in the art will easily adapt the above formulas to the case of daily contributions and distributions.

Figure 6:
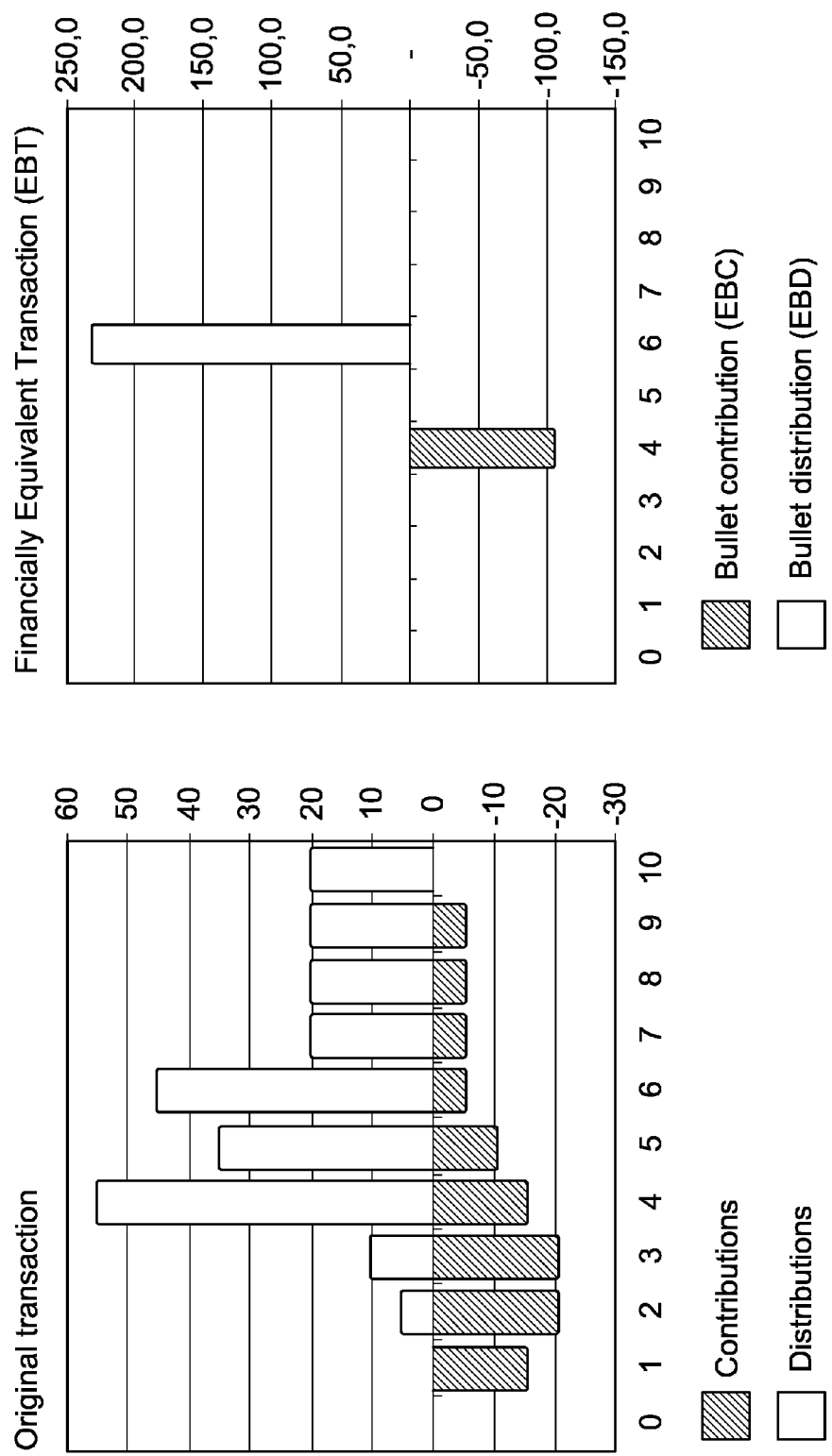
FIG. 6 is a chart graphically depicting the outcome of the method described in FIG. 5.

An example of a chart representation of an original transaction and its financially equivalent EBT transformation is depicted in FIG. 6.

Figure 3:
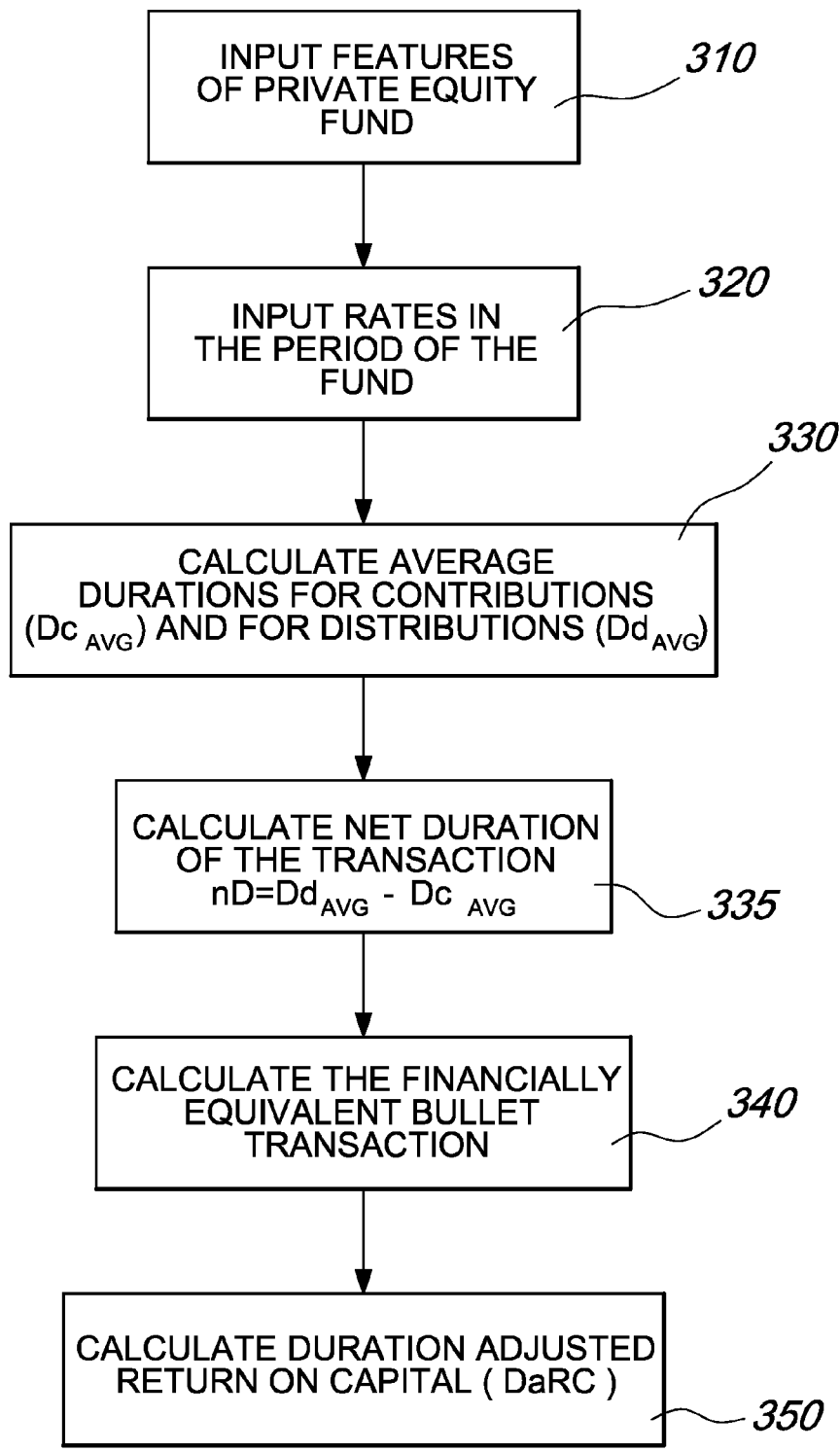
FIG. 3 is a flow diagram describing a possible embodiment of a method for calculating the Duration adjusted Return on Capital (DaRC) indicator according to the present invention.
Figure 4:
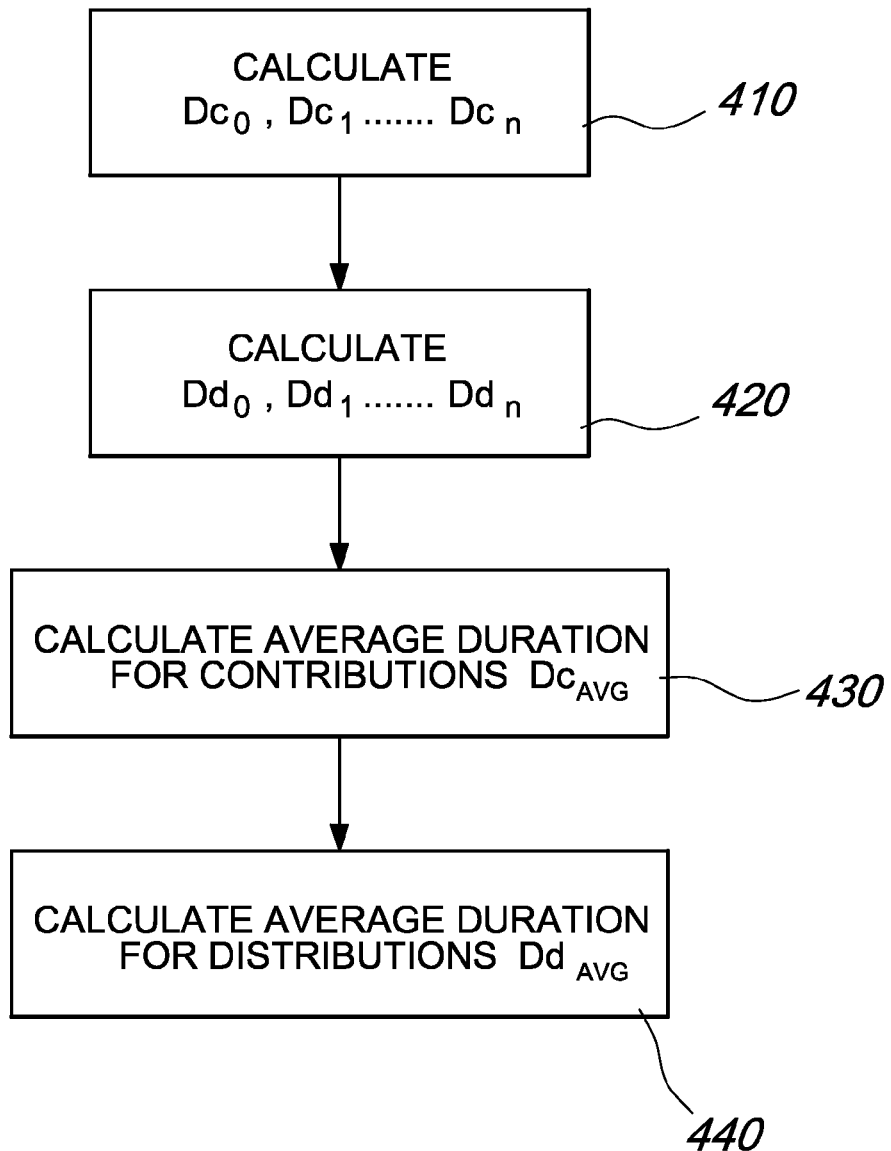
FIG. 4 is a flow diagram describing a possible embodiment of a method for executing step 30 of calculating the average durations of distributions and contributions of FIG. 3 according to the present invention.
Figure 5:
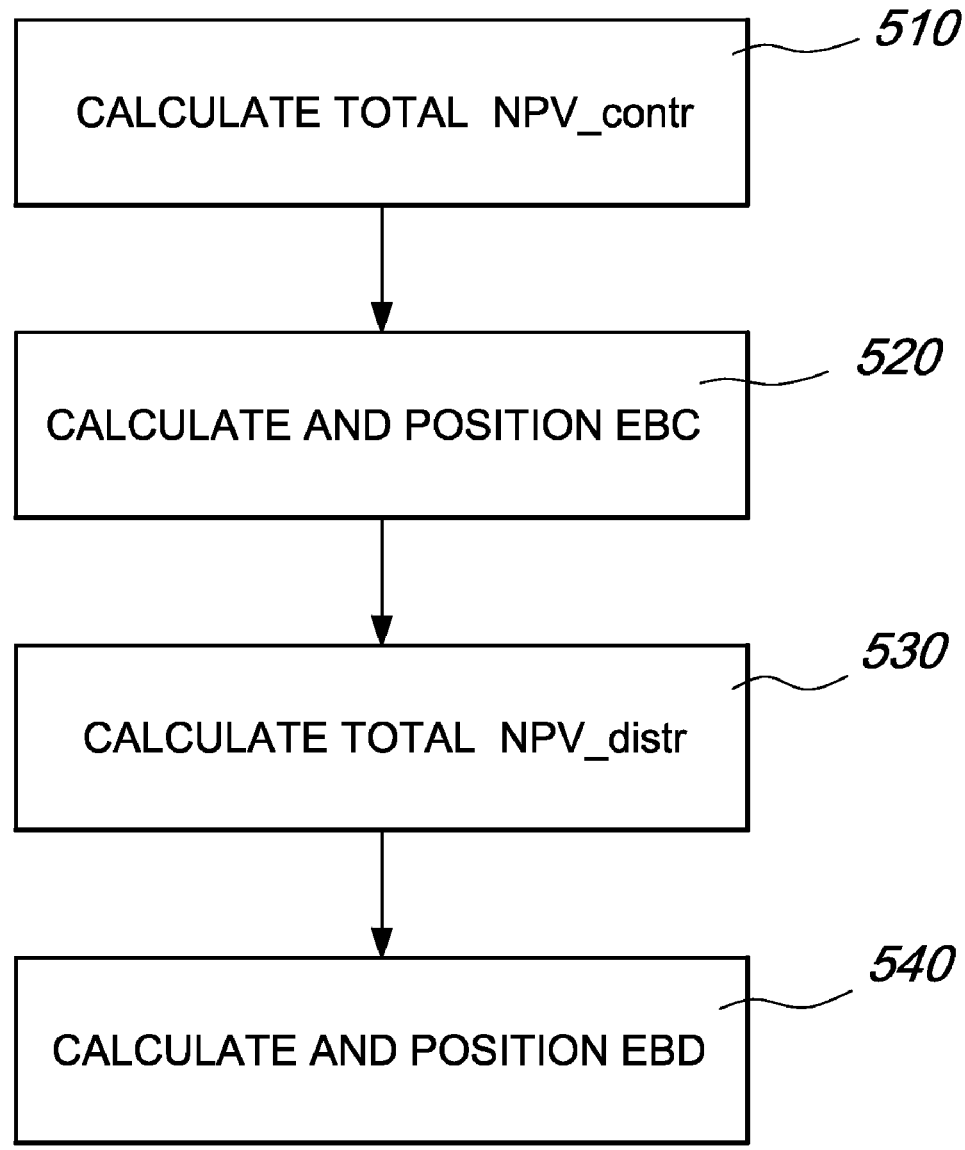
FIG. 5 is a flow diagram describing a possible embodiment of a method for executing step 40 of generating the equivalent bullet transaction of FIG. 3 according to the present invention.
Figure 8A:
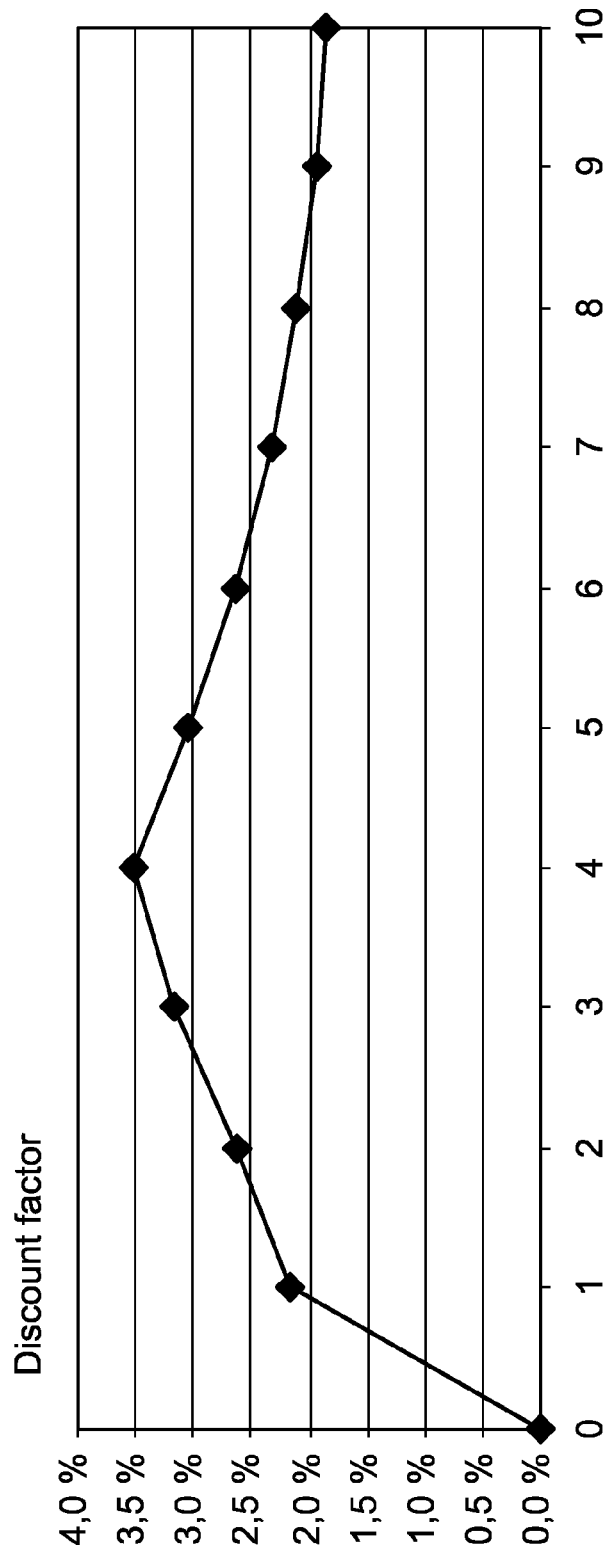
FIG. 8a is a chart representing an exemplary yield curve to be used as input data for carrying out the method of FIG. 3 according to the present invention.

In order to better understand the method outlined with reference to FIGS. 3, 4 and 5, a numerical example will be now provided with reference to FIGS. 8a and 8b.

FIG. 8a depicts a chart of an hypothetical Euribor yield curve for the subperiods considered in the table of FIG. 1a.

FIG. 8b shows an exemplary spreadsheet table for an hypothetical private equity fund. Input columns A, G and H, that is to say the input data regarding subperiods, contributions and distributions, respectively, are the same of FIG. 1a; column E, that is to say the discount factors, corresponds to the values of the chart depicted in FIG. 8a. Input column B, that is to say the rates of interests, is easily derived once the discount factors are known; calculated columns C, D, F, I, J, K, L and M, that is to say the values for year multiplier, cumulative multiplier, price, net cash flows, net present value of all contributions, durations of contributions, net present value of all distributions, durations of distributions, respectively, correspond to the calculated values already described with reference to FIG. 7.

Given the above table, and following the steps outlined in FIGS. 3, 4 and 5, the DaRC is calculated as follows:

The total duration of the contributions $Dc_{AVG}$ is calculated as:

$Dc_{AVG}$=total(columnK)/total(columnJ)=329.1/ 90.4=3.6 years(STEP 330)

The total duration of the distributions $Dd_{AVG}$ is calculated as:

$Dd_{AVG}$=total(columnM)/total(columnL)=1,179.7/ 197.3=5.98 years(STEP 340)

The bullet contribution (EBC) equivalent to the stream of cash outflows is calculated as follows:

fv_NPV_contr=total(columnJ)*cum_mult$_4$= −90.4*1.15=−103.8(STEP 520)

The bullet distribution (EBD) equivalent to the stream of cash inflows is calculated as follows:

fv_NPV_distr=total(columnL)*cum_ mult$_6$=197.3*1.17=230.8(STEP 530)

The EBT financially equivalent to the original transaction M', corresponding to columns A, G, H of FIG. 7b has thus been calculated as:

$$M'' = \begin{bmatrix} 4 & -103.8 \\ 6 & 230.8 \end{bmatrix}$$

A graphical representation of the comparison between transactions M' and M" is depicted in already shown FIG. 6.

The net duration of the transaction nD is calculated as follows, assuming the rounding of duration for simplification purposes:

$nD=Dd_{AVG}-Dc_{AVG}$=6−4=2 years(STEP 335)

The Duration adjusted Return on Capital DaRC is calculated as follows:

$$DdARC = \left(\frac{fv\_NPV\_distr}{fv\_NPV\_contr}\right)^{\frac{1}{nD}} - 1 = \left(\frac{230.8}{103.8}\right)^{\frac{1}{2}} - 1 = 49.1\% \quad \text{(STEP 350)}$$

Figure 8C:
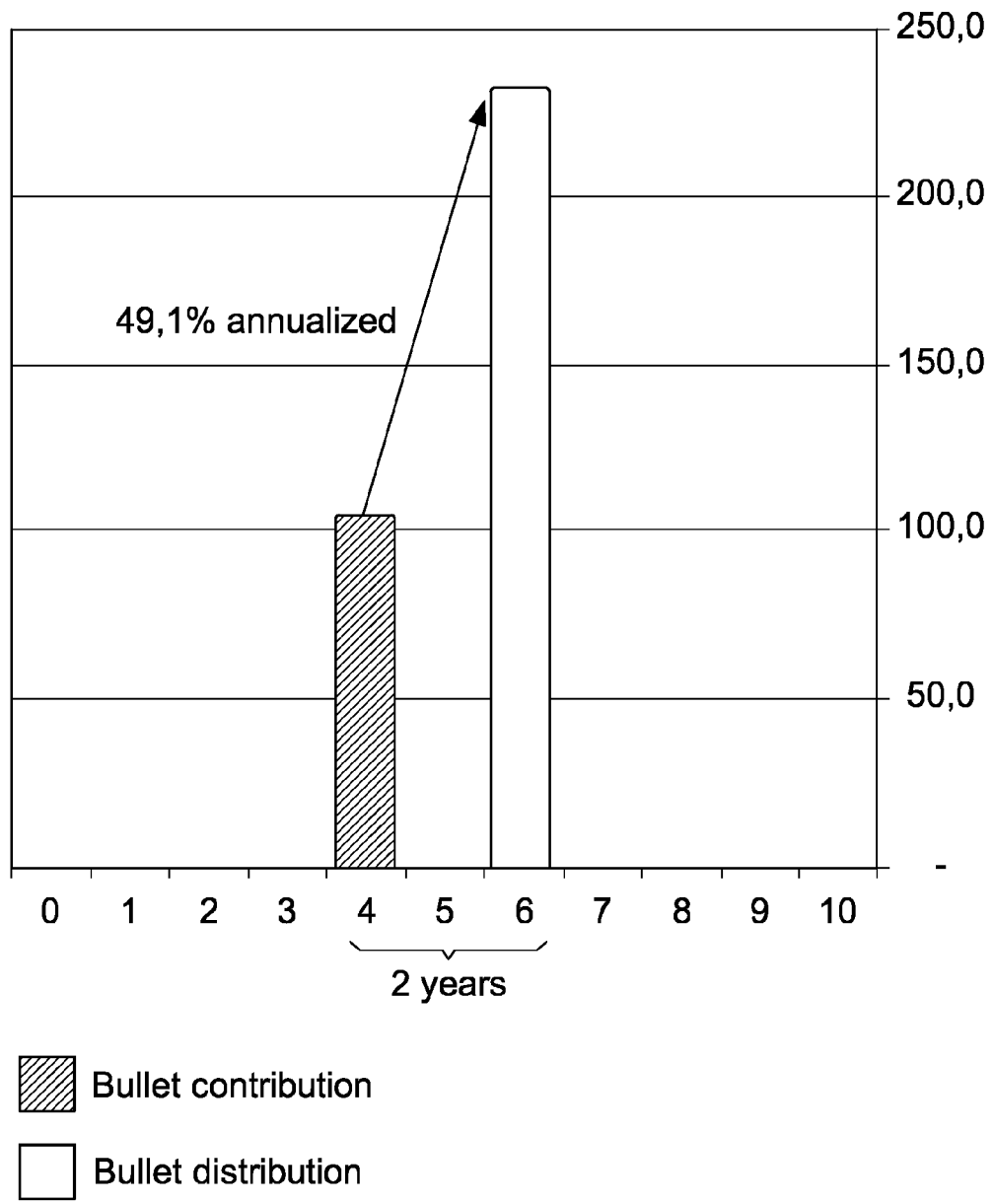
FIG. 8c graphically shows an example calculation of DaRC, with capital growing at a rate of 49.1% compounded annually between year 4 and year 6.

FIG. 8c graphically shows the logic behind the DaRC, with capital growing at a rate of 49.1% compounded annually between year 4 and year 6, i.e. the 2 years deriving from rounding the net duration.

As can be appreciated, as a function of duration, the DaRC is closely correlated to the IRR. But differently from the IRR, it is qualified both in terms of initial invested capital and of time horizon (i.e. the duration).

This feature is useful as it preserves to the DaRC the only element of value associated to the IRR measure, that is to say the fact of being representative of capital efficiency.

Figure 2:
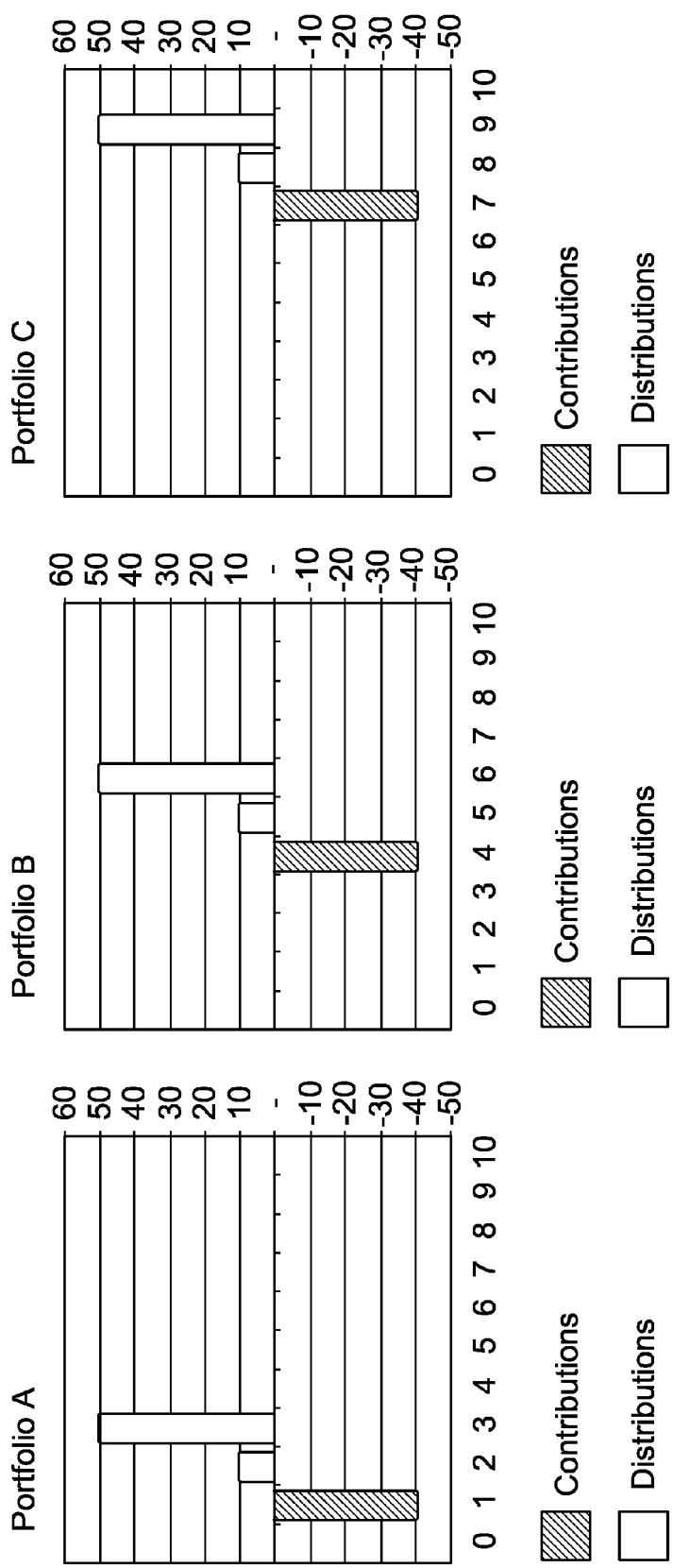
FIG. 2 is a chart depicting simplified cash flow patterns of three different investment opportunities in private equity funds.

In spite of the very high correlation with the IRR, the DaRC has the capability of effectively ranking on an objective basis, and as intuitively expected, different investment typologies. For instance, the three different projects described with reference to FIG. 2 illustrated above, given the relevant yield curve, have the following values for DaRC: portfolio A=22.84%, portfolio B=22.56%, portfolio C=22.55%.

However, it is to be noted that the DaRC, notwithstanding the above mentioned desirable properties, only represents in time weighted terms the intrinsic growth potential of the private equity investing when the bulk of the capital is deployed.

In other words this indicator does not take into account the opportunity cost of the capital waiting to be deployed, that is instead an important element of private equity investing, not only because it pays fees but also because it can be used as a guarantee to enhance the creditworthiness of the fund to which it is committed.

To overcome this limitation, a variation of the DaRC measure named diluted Duration adjusted Return on Capital (dDaRC) is defined, which reconciles the intrinsic growth potential of private equity expressed by the DaRC and the opportunity cost of keeping the committed capital available for the withdrawals.

The dDaRC represents the growth of committed capital from first closing (or the date from which the fund starts charging fees—i.e. it is considered operational) to the term represented by the duration of the distribution in the framework of the EBT (diluted EBT—dEBT). In other words the dDaRC represents the capital growth rate in the period considered by the dEBT transaction.

Figure 9:
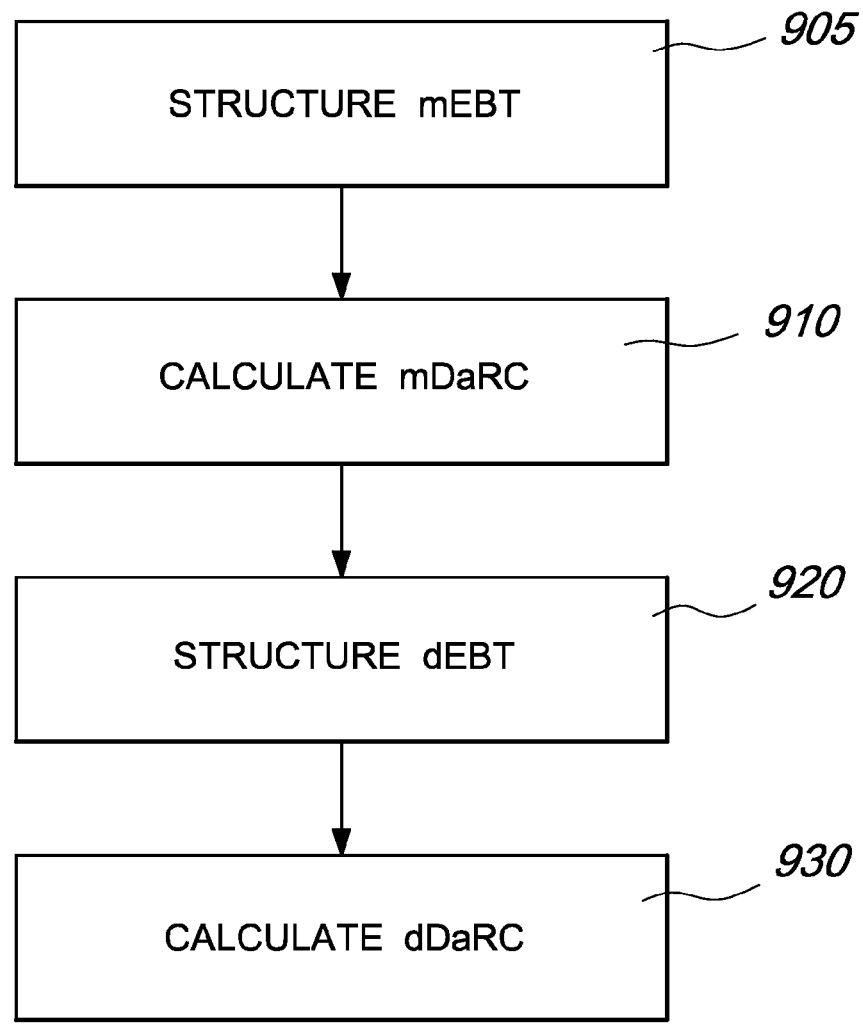
FIG. 9 is a flow diagram describing a possible embodiment of a method for calculating the diluted Duration adjusted Return on Capital (dDaRC) indicator according to the present invention.

A possible method for defining and calculating the dDaRC indicator will now be described with reference to FIG. 9.

At step 905, in order to derive the dEBT transaction, the EBT transaction is first transformed into the "modified" EBT (mEBT) by moving back on the yield curve at $t_0$ the NPV of the contributions (NPV_contr). The M" matrix is modified as follows:

$$M''' = \begin{bmatrix} t_0 & NPV\_contr \\ Dd_{AVG} & EBD \end{bmatrix}$$

At step 910 the growth of the NPV of the contributions to the level of the future value of the NPV of the distributions from year $t_0$ over the period represented by the duration of the distributions $Dd_{AVG}$ is calculated; this value is defined as mDaRC. The mDaRC is calculated according to the following formula:

$$mDaRC = \left(\frac{fv\_NPV\_distr}{NPV\_contr}\right)^{\frac{1}{Dd_{AVG}}} - 1$$

At step 920 the mEBT is adjusted to include the cash eventually unused—the bullet transaction is consequently defined diluted equivalent bullet transaction (dEBT) and the M''' matrix is transformed as follows:

$$M'''' = \begin{bmatrix} t_0 & committed\_capital \\ Dd_{AVG} & EBD + fv\_UCB \end{bmatrix}$$

The additional element to be therefore considered in the dEBT is the growth, over the period represented by the duration of the distributions $Dd_{AVG}$ of the unused cash balance [UCB], that is to say the difference between the committed capital and the NPV_contr;

UCB=committed_capital−NPV_contr

The bullet contribution of the UCB to the diluted EBT transaction is defined fv_UCB and is calculated multiplying the UCB by the multiplier cum_mult$_{[ROUNDUP(Dd_{AVG})]}$, that represents the effect of the reinvestment over the yield curve for the time horizon defined by the duration of the distribution $Dd_{AVG}$.

Finally, at step 930 the dDaRC is calculated based on the two components EBD and fv_UCB respectively calculated at steps 910 and 920, according to the following formula:

$$dDaRC=[(EBD+fv\_UCB)/\text{committed\_capital}]^{(1/Dd_{AVG})}-1$$

By applying the formulas set forth in above steps 910, 920 and 930 to the numerical example set forth above, the following values are obtained for mDaRC, fv_UCB and dDaRC:

$$mDaRC = \left(\frac{230.8}{90.4}\right)^{\frac{1}{6}} - 1 = 16.91\%$$

$$UCB = 100 - 90.4 = 9.6$$

Since $Dd_{AVG}=6$, the cumulative multiplier to be considered is obtained by looking up the table of FIG. 8b at column D, year 6 (1.17):

$$fv\_UCB = UCB * \text{cum\_mult}_{[ROUNDUP(Dd_{AVG})]} = 9.6 * 1.17 = 11.2$$

$$dDaRC = \left(\frac{(230.8+11.2)}{100}\right)^{\frac{1}{6}} - 1 = 15.87\%$$

Figure 10:
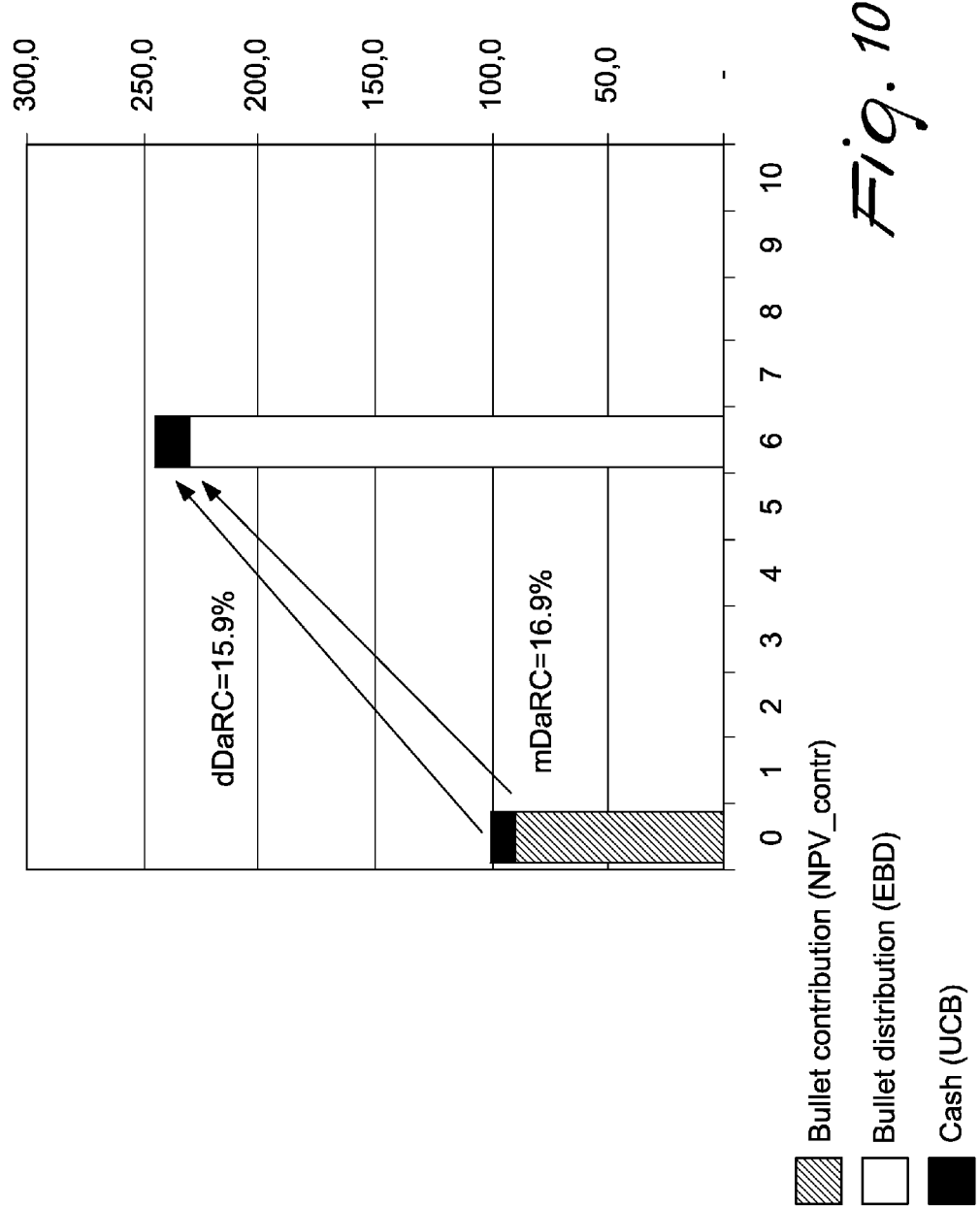
FIG. 10 is a chart graphically depicting the outcome of the method described in FIG. 9.

A graphic representation of the calculated values is shown in FIG. 10.

Those skilled in the art will appreciate that the ratio in the dDaRC calculation between the mEBT terms that are respectively the NPV of the contributions in $Dc_0=t_0$ and the NPV of the distributions moved forward on the yield curve to the $Dd_{AVG}$ time horizon could be tellingly defined as modified TVPI multiple (mTVPI) due to its resemblance to the TVPI multiple currently used in the art.

The combined effect of the two components in the dEBT transaction originating the dDaRC is representative both of the efficiency of private equity investing and of the effectiveness of the deployment of capital committed.

Also, the dDaRC overcomes the issues of IRR multiples shown earlier with reference to FIG. 2, objectively ranking the three portfolios A, B and C, not only under the assumption that the committed capital was identical, but also assuming different commitments, circumstance that would be reflected neither by the IRR nor by the TVPI.

Under the "same commitment" assumption Portfolio A (dDaRC=14.4%) dominates Portfolio B (dDaRC=7.3%) and Portfolio C (dDaRC=5.3%).

Different commitments may change the perspective: if those relating to Portfolio A and Portfolio B were 100 units and that of Portfolio C was 50 units, the results would change as follows: Portfolio A (dDaRC=9.1%) would register a lower performance and still dominate Portfolio B (dDaRC=5.1%) and Portfolio C (dDaRC=5.3%), but the latter would do better than Portfolio B, weighed by a high cash drag.

A final variation of the DaRC measure, the fully diluted DaRC (fdDaRC) indicates the rate of return generated by the private equity transaction assuming that all cash, if not deployed is invested at the rates of the reference yield curve, until the last distribution is received by the investor.

The fdDaRC thus reconciles the DaRC model with the CAGR of the investor wealth.

The fdDaRC can be calculated as the return from the investment of the committed capital, growing at dDaRC for the period defined by the $Dd_{AVG}$ and then at the cash rates on the reference yield curve over the period between the duration of the distributions and the time of the full liquidation of the transaction, that is to say when the last cash distribution is received ($t_n$).

A possible method for defining and calculating the fdDaRC indicator is given by the following formula:

$$fdDaRC=[((EBD+fv\_UCB)*(\text{cum\_mult}_{t_n}/\text{cum\_mult}_{Dd_{AVG}}))]^{(1/t_n)}-1$$

For the hypothetical numerical example considered above with reference to FIGS. 8a and 8b, the fdDaRC is calculated as follows:

$$fdDaRC=[((130.8+11.2)*(1.20/1.17))]^{(1/10)}-1=9.53\%$$

Figure 11:
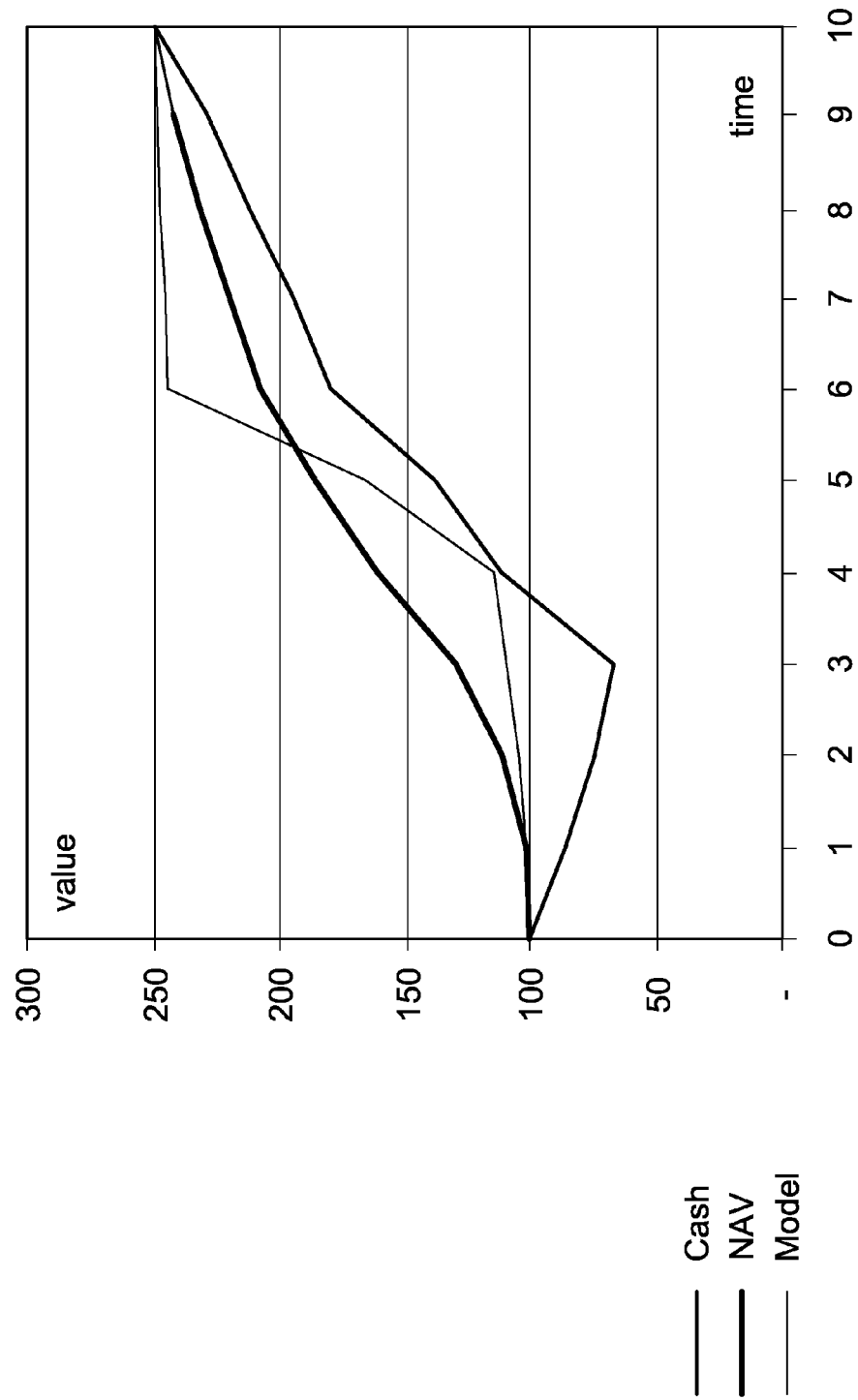
FIG. 11 is a chart graphically comparing model, total wealth with investment and reinvestment of cash balances, and actual cash balances.

The chart depicted in FIG. 11 graphically reconciles, from the investor perspective, model, investment NAV, calculated as the net present value of future net cash flows discounted using the IRR of the transaction grossed up by the undrawn and reimbursed cash availabilities invested at the rates prevailing over the reference yield curve, and actual cash balances, that are also invested at the rates of the reference yield curve.

The fdDaRC rate represents, in the form of an annualized rate of return, the contribution of a private equity investment to the investor's net wealth on a stand-alone and unlevered basis. In fact it has the following features:
  takes into account the general economic environment;
  eliminates the assumptions of over-commitment and leverage implicit in the IRR approach.

It has been shown that the invention fully achieves the intended aim and objects, since DaRC-based performance indices overcome the issues of IRR and are meaningfully comparable to the indices or the performance series of the investments in all other asset classes.

In fact, adequately aggregated DaRC data allows meaningful comparisons with average returns of public markets over comparable time horizons. This makes it possible to estimate risk premiums, alpha and real rate of returns of private equity funds interests.

Moreover the above described systems and methods allow one to derive robust, realistic and practical time weighted performance data for private equity: the key indicator is the diluted Duration adjusted Return on Capital (dDaRC).

As in the fixed income world the zero coupon bond equivalence (and the duration) is pivotal for comparing securities with different characteristics, the dEBT puts private equity transactions in the condition of having their derived unlevered, time-weighted performance measures (dDaRC) objectively comparable among them and against other types of investments.

Differently from the IRR based approach, the methodology's output is a realistic and replicable rate of return, that can be calculated even in the extreme circumstances of negative net duration, is unambiguous also in case of decrease of value, and allows direct and synthetic replications.

An additional advantage of the disclosed systems and method is the fact that, if it is applied to equity and fixed income securities, it provides the results that are obtained calculating their respective compound average growth rate of return and yield to maturity.

The disclosed systems and methods also have several practical applications, in that they introduce a common denominator to integrate primary placements and secondary transactions on listed and unlisted alternative investment vehicles.

In particular, the track record of teams in fund raising expressed in terms of dDaRC will be compared to the expected dDaRC of the outstanding potential secondary trades and the expected returns of listed alternative vehicles.

Clearly, several modifications will be apparent to and can be readily made by those skilled in the art without departing from the scope of the present invention.

For instance, based on the dDaRC as the reference rate, the system and method can also be extended to create over the counter (OTC) derivative contracts, such as swaps, forward, options, futures, etc, or private equity benchmarks. Benchmark-related products and derivative contracts further enhance the possibility of comparison and arbitrage.

The systems and methods can be also advantageously applied to derivatives. Applied to derivatives, the DaRC can be used the valuation engine for the quoted contracts, for instance for comparing a direct fund investment to the investment in a call option on the same fund.

Similarly the diluted EBT disclosed in the systems and methods can be applied to private capital futures. With initial and maintenance margins recreating the leverage/capital efficiency effect, a long position in a private capital future consists in the purchase of a contract that has a predetermined maturity. The pricing of the future over its life will reflect the expectation of investors with regards to the dDaRC of the specific fund interest, anticipating the evolution pattern of the underlying net asset value. The dDaRC will have a dynamic intuitively correlated to the level of the general economy and with the valuation level of the relevant public equity markets.

Moreover, the time weighted nature of the disclosed DaRC-based performance indicators opens to a broad range of applications in the field of benchmarking, since they present the properties required for valid and effective benchmarks, such as investability, as an alternative to other portfolios under consideration; appropriateness, since there is consistence with the portfolios being measured against it; transparence, since the investments in the benchmark and how they perform are understood, and performance can be explained; unambiguity, since name and weight of the index/peer group members are clearly defined. Moreover the benchmarks can be specified in advance with rigorous construction rules.

With regard to FIGS. 1-11, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 12:
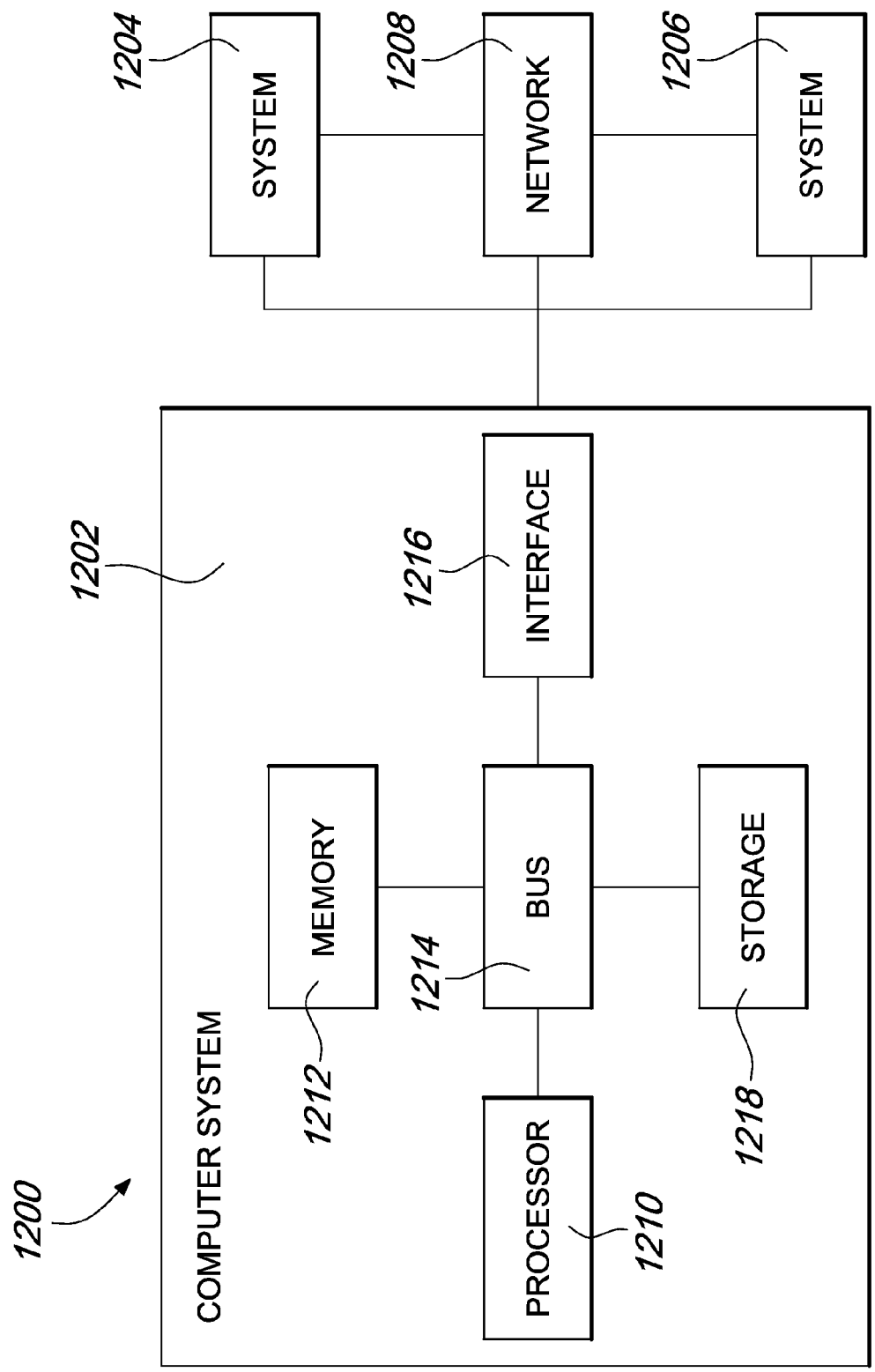
FIG. 12 is a block diagram of a distributed computer system configured to implement the systems and methods according to the present invention.

Referring to FIG. 12, there is illustrated a block diagram of a distributed computer system 1200, in which various aspects and functions are practiced. As shown, the distributed computer system 1200 includes one more computer systems that exchange information. More specifically, the distributed computer system 1200 includes computer systems 1202, 1204 and 206. As shown, the computer systems 1202, 1204 and 1206 are interconnected by, and may exchange data through, a communication network 1208. The network 1208 may include any communication network through which computer systems may exchange data. To exchange data using the network 1208, the computer systems 1202, 1204 and 1206 and the network 1208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1202, 1204 and 1206 may transmit data via the network 1208 using a variety of security measures including, for example, TLS, SSL or VPN. While the distributed computer system 1200 illustrates three networked computer systems, the distributed computer system 1200 is not so limited and may include any number of computer systems and computing devices, networked using any medium and communication protocol.

As illustrated in FIG. 12, the computer system 1202 includes a processor 1210, a memory 1212, a bus 1214, an interface 1216 and data storage 1218. To implement at least some of the aspects, functions and processes disclosed herein, the processor 1210 performs a series of instructions that result in manipulated data. The processor 1210 may be any type of processor, multiprocessor, data processing engine, logic device, programmable logic device, or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1210 is connected to other system components, including one or more memory devices 1212, by the bus 1214.

The memory 1212 stores programs and data during operation of the computer system 1202. Thus, the memory 1212 may be a relatively high performance, volatile, random access memory such as a dynamic random access memory (DRAM) or static memory (SRAM). However, the memory 1212 may include any device for storing data, such as a disk drive or other non-volatile storage device. Various examples may organize the memory 1212 into particularized and, in some cases, unique structures to perform the functions disclosed herein. These data structures may be sized and organized to store values for particular data and types of data.

Components of the computer system 1202 are coupled by an interconnection element such as the bus 1214. The bus 1214 may include one or more physical busses, for example, busses between components that are integrated within a same machine, but may include any communication coupling between system elements including specialized or standard computing bus technologies such as IDE, SCSI, PCI and InfiniBand. The bus 1214 enables communications, such as data and instructions, to be exchanged between system components of the computer system 1202.

The computer system 1202 also includes one or more interface devices 1216 such as input devices, output devices and combination input/output devices. Interface devices 1216 may receive input or provide output. More particularly, output devices may render information for external presentation. Input devices 1216 may accept information from external sources. Examples of interface devices include keyboards, mouse devices, trackballs, microphones, touch screens, printing devices, display screens, speakers, network interface cards, etc. Interface devices allow 1216 the computer system 1202 to exchange information and to communicate with external entities, such as users and other systems.

The data storage 1218 includes a computer readable and writeable nonvolatile, or non-transitory, data storage medium in which instructions are stored that define a program or other object that is executed by the processor 1210. The data storage 1218 also may include information that is recorded, on or in, the medium, and that is processed by the processor 1210 during execution of the program. More specifically, the information may be stored in one or more data structures specifically configured to conserve storage space or increase data exchange performance. The instructions may be persistently stored as encoded signals, and the instructions may cause the processor 1210 to perform any of the functions described herein. The medium may, for example, be optical disk, magnetic disk or flash memory, among others. In operation, the processor 1210 or some other controller causes data to be read from the nonvolatile recording medium into another memory, such as the memory 1212, that allows for faster access to the information by the processor 1210 than does the storage medium included in the data storage 1218. The memory may be located in the data storage 1218 or in the memory 1212, however, the processor 1210 manipulates the data within the memory, and then copies the data to the storage medium associated with the data storage 1218 after processing is completed. A variety of components may manage data movement between the storage medium and other memory elements and examples are not limited to particular data management components. Further, examples are not limited to a particular memory system or data storage system.

Although the computer system 1202 is shown by way of example as one type of computer system upon which various aspects and functions may be practiced, aspects and functions are not limited to being implemented on the computer system 1202 as shown in FIG. 12. Various aspects and functions may be practiced on one or more computers having a different architectures or components than that shown in FIG. 12. For instance, the computer system 1202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1202 may be a computer system including an operating system that manages at least a portion of the hardware elements included in the computer system 1202. In some examples, a processor, data processing engine, or controller, such as the processor 1210, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 1210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Having now described some illustrative embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one embodiment are not intended to be excluded from a similar role in other embodiments.

Note that in FIGS. 1 through 12, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes non-transitory and other data signals embodied in one or more of a carrier wave, a computer disk (magnetic, or optical (e.g., CD or DVD, or both)), non-volatile memory, tape, a system memory, and a computer hard drive.

Any references to embodiments or elements or acts of the systems and methods herein referred to in the singular may also embrace embodiments including a plurality of these elements, and any references in plural to any embodiment or element or act herein may also embrace embodiments including only a single element.

References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts.

The systems and methods described herein may be embodied in other specific forms without departing from the characteristics thereof. The foregoing embodiments are illustrative rather than limiting of the described systems and methods. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by those skilled in the art.

The invention claimed is:

1. A computer implemented method for the calculation of performance data for a private equity fund, comprising the steps of:

a) acquiring input data representative of a first transaction of cash flow patterns of said private equity fund during a term of said fund, said term being divided into a plurality subperiods $t_0, t_1, \ldots t_n$, wherein for each subperiod $t_i$, a value for contribution $Contr_i$ and a value for the distribution $Distr_i$ in that subperiod is supplied;

b) acquiring input data representative of a plurality of rates of interest $r_0, r_1, \ldots r_n$, respectively associated to said plurality of subperiods;

c) calculating, by a processor, based on said input data representative of said first transaction of cash flow patterns and on said input data representative of said plurality of rates of interest, a first value representative of an average duration of contributions and a second value representative of an average duration of distributions for said fund;

d) calculating, by the processor, based on said first value and said second value, a third value representative of a net duration of said first transaction;

e) calculating, by the processor, based on said first value, said second value and said third value, a second bullet transaction equivalent to said first transaction, by calculating a fourth value representative of a bullet investment paid at the time represented by said first value and a fifth value representative of a bullet reimbursement received at the time represented by said second value; and f) calculating, by the processor, based on said second bullet transaction and said third value, a sixth value representative of a duration adjusted return on capital—DaRC.

2. The computer implemented method according to claim 1, wherein said step c) comprises the steps of:

c1) calculating, for each subperiod $t_i$ of said plurality of subperiods, a value representative of the net present value of the contributions in said subperiod, according to the following formula:

$$NPV\_Contr_i = Contr_i / [(1+r_0)*(1+r_1)* \ldots *(1+r_i)];$$

c2) calculating, for each subperiod $t_i$ of said plurality of subperiods, a value representative of the net present value of the distributions in said subperiod, according to the following formula:

$$NPV\_Distr_i = Distr_i / [(1+r_0)*(1+r_1)* \ldots *(1+r_i)];$$

c3) calculating, for each subperiod $t_i$ of said plurality of subperiods, a value representative of the average duration of the contributions in said subperiod, according to the following formula:

$$Dc_i = t_i * NPV\_Contr_i;$$

c4) calculating, for each subperiod $t_i$ of said plurality of subperiods, a value representative of the duration of the distributions in said subperiod, according to the following formula:

$$Dd_i = t_i * NPV\_Distr_i;$$

c5) calculating, based on said values acquired at steps a) and b) and on said plurality of values calculated at step c1), said first value representative of an average duration of the contributions according to the following formula:

$$Dc_{AVG} = \frac{\sum_{i=0}^{n} t_i * NPV\_contr_i}{\sum_{i=0}^{n} NPV\_contr_i} = \frac{\sum_{i=0}^{n} Dc_i}{\sum_{i=0}^{n} NPV\_contr_i}$$

wherein $Dc_{AVG}$ is said first value representative of an average duration of the contributions; and c6) calculating, based on said values acquired at steps a) and b) and on said plurality of values calculated at step c2), said second value representative of an average duration of the distributions, according to the following formula:

$$Dd_{AVG} = \frac{\sum_{i=0}^{n} t_i * NPV\_distr_i}{\sum_{i=0}^{n} NPV\_distr_i} = \frac{\sum_{i=0}^{n} Dd_i}{\sum_{i=0}^{n} NPV\_distr_i}$$

wherein $Dd_{AVG}$ is said second value representative of an average duration of the distributions.

3. The computer implemented method according to claim 1, wherein said third value representative of a net duration of said first transaction is calculated according to the following formula:

$$nD = Dd_{AVG} - Dc_{AVG}$$

wherein nD is said third value representative of a net duration of said first transaction.

4. The computer implemented method according to according to claim 1, wherein said step e) of calculating said second bullet transaction comprises the steps of:
  e1) calculating a value representative of the total of the net present value of all contributions, according to the following formula:

$$NPV\_contr = \sum_{i=0}^{n} NPV\_contr_i$$

wherein NPV_contr is the total of the net present value of all contributions;
  e2) calculating and positioning, based on said value representative of the total of the net present value of all contributions calculated at step e1) and on said input data representative of a plurality of rates of interest acquired at step b), a value representative of a bullet contribution equivalent to the stream of cash outflows, according to the following formula:

$$EBC = NPV\_contr*(1+r_0)*(1+r_i)* \ldots *(1+r_j),$$

wherein EBC is the bullet contribution equivalent and wherein j corresponds to the subperiod obtained by rounding up the value of $Dc_{AVG}$;
  e3) calculating a value representative of the total of the net present value of all distributions, according to the following formula:

$$NPV\_distr = \sum_{i=0}^{n} NPV\_distr_i$$

wherein NPV_distr is the total of the net present value of all distributions; and
  e4) calculating and positioning, based on said total of the net present value of all distributions calculated at step e3) and on said input data representative of a plurality of rates of interest acquired at step b), a bullet distribution equivalent of the stream of cash inflows, according to the following formula:

$$EBD = NPV\_distr*(1+r_0)*(1+r_1)* \ldots *(1+r_k)$$

wherein EBD is the bullet distribution equivalent and wherein k corresponds to the subperiod obtained by rounding up the value of $Dd_{AVG}$.

5. The computer implemented method according to claim 1, comprising:

calculating said fourth value representative of a duration adjusted return on capital is performed according to the following formula:

$$DaRC = \left(\frac{EBD}{EBC}\right)^{\frac{1}{nD}} - 1$$

wherein DaRC is said fourth value representative of a duration adjusted return on capital.

6. The computer implemented method according to claim 1, comprising the step of calculating, based on said input data representative of a plurality of rates of interest $r_0, r_1, \ldots r_n$ acquired at step b), a yield curve representing the variation of a value representative of a discount factor over said subperiods $t_0, t_1, \ldots t_n$, wherein for each subperiod $t_i$ the corresponding value on the curve is calculated according to the following formula:

$$Disc\_fact_i = ((1+r_0)*(1+r_1)* \ldots *(1+r_j))^{\frac{1}{t_i}} - 1$$

wherein $Disc\_fact_i$ is said value representative of a discount factor over subperiod $t_i$.

7. The computer implemented method according to claim 4, further comprising the steps of:
  g) transforming said second bullet transaction calculated at step e) into a modified equivalent bullet transaction, by moving back the net present value of the contributions on said yield curve to the first subperiod $t_0$ of said plurality of subperiods;
  h) calculating a value representative of a modified Duration adjusted Return on Capital according to the following formula:

$$mDaRC = \left(\frac{EBD}{NPV\_contr}\right)^{\frac{1}{Dd_{AVG}}} - 1$$

wherein mDaRC is said value representative of a modified Duration adjusted Return on Capital;
  i) transforming said modified bullet transaction calculated at step g) into a diluted equivalent bullet transaction based on the difference between a committed capital and the net present value of all contributions, according to:

$$\begin{bmatrix} t_0 & committed\_captial \\ Dd_{AVG} & EBD + fv\_UCB \end{bmatrix},$$

wherein the value committed_capital is calculated according to the following formula:

$$commited\_capital = \sum_{i=0}^{n} contr_i$$

and the value of fv_UCB is calculated according to the following formula:

$$fv\_UCB = (committed\_capital - NPV\_contr)*(1+r_0)*(1+r_1)* \ldots *(1+r_k);$$

1) calculating (930) a value representative of the diluted Duration adjusted Return on Capital, according to the following formula:

$$dDaRC = [(EBD+fv\_UCB)/\text{committed\_capital}]^{(1/Dd_{AVG})} - 1$$

wherein dDaRC is said value representative of the diluted Duration adjusted Return on Capital.

8. The computer implemented method according to claim 7, further comprising the step of calculating a value representative of the fully diluted Duration adjusted Return on Capital, according to the following formula:

$$fdDaRC = \left[\left((EBD + \text{fv\_UCB}) * \left(\frac{(1+r_0)*(1+r_1)*\ldots*(1+r_n)}{(1+r_0)*(1+r_1)*\ldots*(1+r_k)}\right)\right)\right]^{\left(\frac{1}{t_n}\right)} - 1$$

wherein fdDaRC is said value representative of the fully diluted Duration adjusted Return on Capital.

9. A non-transitory computer readable medium having stored thereon sequences of instruction including instructions that when executed cause a processor to:
   a) acquire input data representative of a first transaction of cash flow patterns of a private equity fund during a term of said fund, said term being divided into a plurality subperiods $t_0, t_1, \ldots t_n$, wherein for each subperiod $t_i$, a value for contribution $\text{Contr}_i$ and a value for the distribution $\text{Distr}_i$ in that subperiod is supplied;
   b) acquire input data representative of a plurality of rates of interest $r_0, r_1, \ldots r_n$ respectively associated to said plurality of subperiods;
   c) calculate, based on said input data representative of said first transaction of cash flow patterns and on said input data representative of said plurality of rates of interest, a first value representative of an average duration of contributions and a second value representative of an average duration of distributions for said fund;
   d) calculate, based on said first value and said second value, a third value representative of a net duration of said first transaction;
   e) calculate, based on said first value, said second value and said third value, a second bullet transaction equivalent to said first transaction, by calculating a fourth value representative of a bullet investment paid at the time represented by said first value and a fifth value representative of a bullet reimbursement received at the time represented by said second value; and
   f) calculate, based on said second bullet transaction and said third value, a sixth value representative of a duration adjusted return on capital—DaRC.

10. The non-transitory computer readable medium of claim 9, further having stored thereon sequences of instruction including instructions that will cause the processor to, for step c):
   c1) calculate, for each subperiod $t_i$ of said plurality of subperiods, a value representative of the net present value of the contributions in said subperiod, according to the formula:

$$NPV\_\text{Contr}_i = \text{Contr}_i/[(1+r_0)*(1+r_1)*\ldots*(1+r_i)];$$

c2) calculate, for each subperiod $t_i$ of said plurality of subperiods, a value representative of the net present value of the distributions in said subperiod, according to the formula:

$$NPV\_\text{Distr}_i = \text{Distr}_i/[(1+r_0)*(1+r_i)*\ldots*(1+r_i)];$$

c3) calculate, for each subperiod $t_i$ of said plurality of subperiods, a value representative of the average duration of the contributions in said subperiod, according to the formula:

$$Dc_i = t_i * NPV\_\text{Contr}_i;$$

c4) calculate, for each subperiod $t_i$ of said plurality of subperiods, a value representative of the duration of the distributions in said subperiod, according to the formula:

$$Dd_i = t_i * NPV\_\text{Distr}_i;$$

c5) calculate, based on said values acquired at steps a) and b) and on said plurality of values calculated at step c1), said first value representative of an average duration of the contributions according to the formula:

$$Dc_{AVG} = \frac{\sum_{i=0}^{n} t_i * NPV\_\text{contr}_i}{\sum_{i=0}^{n} NPV\_\text{contr}_i} = \frac{\sum_{i=0}^{n} Dc_i}{\sum_{i=0}^{n} NPV\_\text{contr}_i}$$

wherein $Dc_{AVG}$ is said first value representative of an average duration of the contributions; and
   c6) calculate, based on said values acquired at steps a) and b) and on said plurality of values calculated at step c2), said second value representative of an average duration of the distributions, according to the formula:

$$Dd_{AVG} = \frac{\sum_{i=0}^{n} t_i * NPV\_\text{distr}_i}{\sum_{i=0}^{n} NPV\_\text{distr}_i} = \frac{\sum_{i=0}^{n} Dd_i}{\sum_{i=0}^{n} NPV\_\text{distr}_i}$$

wherein $Dd_{AVG}$ is said second value representative of an average duration of the distributions.

11. The non-transitory computer readable medium of claim 9, further having stored thereon sequences of instruction including instructions that will cause the processor to:
   calculate said third value representative of a net duration of said first transaction according to the formula:

$$nD = Dd_{AVG} - Dc_{AVG},$$

wherein nD is said third value representative of a net duration of said first transaction.

12. The non-transitory computer readable medium of claim 9, further having stored thereon sequences of instruction including instructions that will cause the processor to, for step e):
   e1) calculate a value representative of the total of the net present value of all contributions, according to the formula:

$$NPV\_\text{contr} = \sum_{i=0}^{n} NPV\_\text{contr}_i$$

wherein NPV_contr is the total of the net present value of all contributions;
   e2) calculate and position, based on said value representative of the total of the net present value of all contributions calculated at step e1) and on said input data representative of a plurality of rates of interest acquired at step b), a value representative of a bullet contribution equivalent to the stream of cash outflows, according to the formula:

$$EBC = NPV\_contr*(1+r_0)*(1+r_1)* \ldots *(1+r_j),$$

wherein EBC is the bullet contribution equivalent and wherein j corresponds to the subperiod obtained by rounding up the value of $Dc_{AVG}$;

e3) calculate a value representative of the total of the net present value of all distributions, according to the formula:

$$NPV\_distr = \sum_{i=0}^{n} NPV\_distr_i$$

wherein NPV_distr is the total of the net present value of all distributions; and e4) calculate and position, based on said total of the net present value of all distributions calculated at step e3) and on said input data representative of a plurality of rates of interest acquired at step b), a bullet distribution equivalent of the stream of cash inflows, according to the formula:

$$EBD = NPV\_distr*(1+r_0)*(1+r_1)* \ldots *(1+r_k)$$

wherein EBD is the bullet distribution equivalent and wherein k corresponds to the subperiod obtained by rounding up the value of $Dd_{AVG}$.

13. The non-transitory computer readable medium of claim 9, further having stored thereon sequences of instruction including instructions that will cause the processor to, for step f):
calculate the duration adjusted return on capital is performed according to the formula:

$$DaRC = \left(\frac{EBD}{EBC}\right)^{\frac{1}{nD}} - 1$$

wherein DaRC is said fourth value representative of a duration adjusted return on capital.

14. The non-transitory computer readable medium of claim 9, further having stored thereon sequences of instruction including instructions that will cause the processor to:
calculate, based on said input data representative of a plurality of rates of interest $r_0, r_1, \ldots r_n$ acquired at step b), a yield curve representing the variation of a value representative of a discount factor over said subperiods $t_0, t_1, \ldots t_n$, wherein for each subperiod $t_i$ the corresponding value on the curve is calculated according to the formula:

$$Disc\_fact_i = ((1+r_0)*(1+r_1)* \ldots *(1+r_j))^{\frac{1}{t_i}} - 1,$$

wherein $Disc\_fact_i$ is said value representative of a discount factor over subperiod $t_i$.

15. The non-transitory computer readable medium of claim 12, further having stored thereon sequences of instruction including instructions that will cause the processor to:
transform said second bullet transaction calculated at step e) into a modified equivalent bullet transaction, by moving back the net present value of the contributions on said yield curve to the first subperiod $t_0$ of said plurality of subperiods;
calculate a value representative of a modified Duration adjusted Return on Capital according to the formula:

$$nDaRC = (EBD/NPV\_contr)^{\frac{1}{Dd_{AVG}}} - 1$$

wherein mDaRC is said value representative of a modified Duration adjusted Return on Capital;
transform said modified bullet transaction calculated at step g) into a diluted equivalent bullet transaction based on the difference between a committed capital and the net present value of all contributions, according to:

$$\begin{bmatrix} t_0 & committed\_capital \\ Dd_{AVG} & EBD + fv\_UCB \end{bmatrix}.$$

wherein the value committed_capital is calculated according to the formula:

$$committed\_capital = \sum_{i=0}^{n} contr_i$$

and the value of fv_UCB is calculated according to the formula:

$$fv\_UCB = (committed\_capital - NPV\_contr)*(1+r_0)* (1+r_1)* \ldots *(1+r_k);$$

calculate (STEP 930) a value representative of the diluted Duration adjusted Return on Capital, according to the formula:

$$dDaRC = [(EBD + fv\_UCB)/committed\_capital]^{\wedge}(1/Dd_{AVG}) - 1$$

wherein dDaRC is said value representative of the diluted Duration adjusted Return on Capital.

16. The non-transitory computer readable medium of claim 15, further having stored thereon sequences of instruction including instructions that will cause the processor to:
calculate a value representative of the fully diluted Duration adjusted Return on Capital, according to the formula:

$$fdDaRC = \left[\left((EBD + fv\_UCB) * \left(\frac{(1+r_0)*(1+r_1)* \ldots *(1+r_n)}{(1+r_0)*(1+r_1)* \ldots *(1+r_k)}\right)\right)\right]^{\left(\frac{1}{t_n}\right)} - 1$$

wherein fdDaRC is said value representative of the fully diluted Duration adjusted Return on Capital.

17. A computer system having a processor and an interface device operatively connected to the processor, comprising:
a) the interface device configured to acquire input data representative of a first transaction of cash flow patterns of a private equity fund during a term of said fund, said term being divided into a plurality subperiods $t_0, t_1, \ldots t_n$, wherein for each subperiod $t_i$, a value for contribution $Contr_i$ and a value for the distribution $Distr_i$ in that subperiod is supplied;

b) the interface device configured to acquire input data representative of a plurality of rates of interest $r_0, r_1, \ldots r_n$ respectively associated to said plurality of subperiods;

c) the processor configured to calculate, based on said input data representative of said first transaction of cash flow patterns and on said input data representative of said plurality of rates of interest, a first value representative of an average duration of contributions and a second value representative of an average duration of distributions for said fund;

d) the processor configured to calculate, based on said first value and said second value, a third value representative of a net duration of said first transaction;

e) the processor configured to calculate, based on said first value, said second value and said third value, a second bullet transaction equivalent to said first transaction, by calculating a fourth value representative of a bullet investment paid at the time represented by said first value and a fifth value representative of a bullet reimbursement received at the time represented by said second value; and f) the processor configured to calculate, based on said second bullet transaction and said third value, a sixth value representative of a duration adjusted return on capital—DaRC.

18. The computer system of claim 17, comprising:

the processor configured to calculate, for each subperiod $t_i$ of said plurality of subperiods, a value representative of the net present value of the contributions in said subperiod, according to the formula:

$NPV\_Contr_i = Contr_i / [(1+r_0)*(1+r_1)* \ldots *(1+r_i)];$ the processor configured to calculate, for each subperiod $t_i$ of said plurality of subperiods, a value representative of the net present value of the distributions in said subperiod, according to the formula:

$NPV\_Distr_i = Distr_i / [(1+r_0)*(1+r_1)* \ldots *(1+r_i)];$ the processor configured to calculate, for each subperiod $t_i$ of said plurality of subperiods, a value representative of the average duration of the contributions in said subperiod, according to the formula:

$Dc_i = t_i * NPV\_Contr_i;$ the processor configured to calculate, for each subperiod $t_i$ of said plurality of subperiods, a value representative of the duration of the distributions in said subperiod, according to the formula:

$Dd_i = t_i * NPV\_Distr_i;$ the processor configured to calculate, based on said values acquired at steps a) and b) and on said plurality of values calculated at step c1), said first value representative of an average duration of the contributions according to the formula:

$$Dc_{AVG} = \frac{\sum_{i=0}^{n} t_i * NPV\_contr_i}{\sum_{i=0}^{n} NPV\_contr_i} = \frac{\sum_{i=0}^{n} Dc_i}{\sum_{i=0}^{n} NPV\_contr_i}$$

wherein $Dc_{AVG}$ is said first value representative of an average duration of the contributions; and the processor configured to calculate, said second value representative of an average duration of the distributions, according to the formula:

$$Dd_{AVG} = \frac{\sum_{i=0}^{n} t_i * NPV\_distr_i}{\sum_{i=0}^{n} NPV\_distr_i} = \frac{\sum_{i=0}^{n} Dd_i}{\sum_{i=0}^{n} NPV\_distr_i}$$

wherein $Dd_{AVG}$ is said second value representative of an average duration of the distributions.

19. The computer system of claim 17, comprising:

the processor configured to calculate said third value representative of a net duration of said first transaction according to the formula:

$nD = Dd_{AVG} - Dc_{AVG},$ wherein nD is said third value representative of a net duration of said first transaction.

20. The computer system of claim 17, comprising:

the processor configured to calculate said fourth value representative of a duration adjusted return on capital is performed according to the following formula:

$$DaRC = \left(\frac{EBD}{EBC}\right)^{\frac{1}{nD}} - 1$$

wherein DaRC is said fourth value representative of a duration adjusted return on capital.

* * * * *